(12) United States Patent
Wang et al.

(10) Patent No.: US 12,334,087 B2
(45) Date of Patent: Jun. 17, 2025

(54) PSYCHOACOUSTICS-BASED AUDIO ENCODING METHOD AND APPARATUS

(71) Applicant: HUAWEI TECHNOLOGIES CO., LTD., Guangdong (CN)

(72) Inventors: Meng Wang, Shenzhen (CN); Zhuo Wang, Shenzhen (CN); Fan Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 206 days.

(21) Appl. No.: 17/990,388

(22) Filed: Nov. 18, 2022

(65) Prior Publication Data

US 2023/0091607 A1 Mar. 23, 2023

Related U.S. Application Data

(63) Continuation of application No. PCT/CN2021/086256, filed on Apr. 9, 2021.

(30) Foreign Application Priority Data

May 22, 2020 (CN) .......................... 202010444294.2

(51) Int. Cl.
*G10L 15/22* (2006.01)
*G06F 3/16* (2006.01)
(Continued)

(52) U.S. Cl.
CPC .......... *G10L 19/0204* (2013.01); *G06F 3/165* (2013.01); *G10L 25/21* (2013.01)

(58) Field of Classification Search
None
See application file for complete search history.

(56) References Cited

U.S. PATENT DOCUMENTS 7,627,481 B1* 12/2009 Kuo ................... G10L 19/025
704/500
10,043,527 B1* 8/2018 Gurijala ............... G10L 19/018
(Continued)

FOREIGN PATENT DOCUMENTS

EP 3598440 A1 1/2020
EP 3614380 A1 2/2020

OTHER PUBLICATIONS

Extended European Search Report in European Appln. No. 21807555.4, mailed on May 9, 2023, 6 pages.

*Primary Examiner* — Neeraj Sharma
(74) *Attorney, Agent, or Firm* — Fish & Richardson P.C.

(57) ABSTRACT

This application provides example psychoacoustics-based audio encoding methods and apparatuses. One example method includes receiving audio data. The audio data can be decoded. Auditory feature information of a user can be obtained, where the auditory feature information includes at least one of the following: personal information, listening test result information, or frequency response curve information. A psychoacoustics model parameter of the user can be calculated based on the auditory feature information of the user, where the psychoacoustics model parameter includes at least one of the following: an intra-band masking parameter, a slope of a low-frequency inter-band masking line, a slope of a high-frequency inter-band masking line, or a human ear quiet threshold curve. The decoded audio data can be encoded based on the psychoacoustics model parameter of the user.

18 Claims, 16 Drawing Sheets

(51) Int. Cl.
    *G10L 19/02*         (2013.01)
    *G10L 25/21*         (2013.01)

(56) References Cited

U.S. PATENT DOCUMENTS

| | | | |
|---|---|---|---|
| 10,628,604 B1* | 4/2020 | Thackston | G06F 21/6227 |
| 2002/0147595 A1* | 10/2002 | Baumgarte | G10L 19/02 |
| | | | 704/E19.01 |
| 2009/0083043 A1* | 3/2009 | Philippe | G10L 19/035 |
| | | | 704/500 |
| 2011/0035212 A1* | 2/2011 | Briand | G10L 19/035 |
| | | | 704/E19.01 |
| 2011/0040566 A1* | 2/2011 | Moon | G10L 19/008 |
| | | | 704/500 |
| 2016/0140981 A1* | 5/2016 | Niedermeier | G10L 19/0208 |
| 2016/0196826 A1* | 7/2016 | Stone | G10L 19/022 |
| | | | 704/200.1 |
| 2017/0352342 A1* | 12/2017 | Lee | H04R 3/04 |
| 2018/0090151 A1* | 3/2018 | Dick | H04S 3/008 |
| 2019/0230438 A1* | 7/2019 | Hatab | G10L 25/18 |
| 2020/0029159 A1* | 1/2020 | Clark | G10K 11/1752 |
| 2020/0312103 A1* | 10/2020 | Noll | G06F 3/016 |

\* cited by examiner

PSYCHOACOUSTICS-BASED AUDIO ENCODING METHOD AND APPARATUS

CROSS-REFERENCE TO RELATED APPLICATIONS

This application is a continuation of International Application No. PCT/CN2021/086256, filed on Apr. 9, 2021, which claims priority to Chinese Patent Application No. 202010444294.2, filed on May 22, 2020. The disclosures of the aforementioned applications are hereby incorporated by reference in their entireties.

TECHNICAL FIELD

Embodiments of this application relate to the field of audio encoding technologies, and in particular, to a psychoacoustics-based audio encoding method and apparatus.

BACKGROUND

An electronic device (for example, a mobile phone or a tablet computer) encodes audio according to an encoding standard specified in an audio transmission protocol, and then sends the encoded audio to a broadcasting device (for example, a headset or a smart speaker). The broadcasting device decodes and plays the audio. Therefore, a user wearing or holding the broadcasting device can hear corresponding audio.

Performing lossy encoding on audio can reduce a quantity of bits used for encoding. Lossy encoding is an encoding method in which important information in to-be-encoded audio is encoded, and unimportant information is not encoded. The part of information that is not encoded is usually information that cannot be perceived by a human ear. Currently, masking effect based on a psychoacoustics model may determine which information in a section of audio is information that cannot be perceived by a human ear. Specifically, in an audio encoding process, four preset psychoacoustics model parameters (which are respectively an intra-band masking parameter, a slope of a low-frequency inter-band masking line, a slope of a high-frequency inter-band masking line, and a human ear quiet threshold curve) are first used to determine information that is in the to-be-encoded audio and that cannot be perceived by a human ear. Then, a corresponding encoding standard (for example, AAC or MP3) is used to encode information (that is, information that can be perceived by a human ear) in the to-be-encoded audio other than information that cannot be perceived by a human ear.

However, the foregoing four preset psychoacoustics model parameters are a group of fixed parameters obtained based on statistical data of a psychoacoustics experiment. Audio encoding is performed based on the preset psychoacoustics model parameters, and an encoding result of the four preset psychoacoustics model parameters may not meet audio quality requirements of different users.

SUMMARY

Embodiments of this application provide a psychoacoustics-based audio encoding method and apparatus, to meet a listening requirement of a user and improve sound quality experience of the user.

To achieve the foregoing objectives, the following technical solutions are used in embodiments of this application.

According to a first aspect, an embodiment of this application provides a psychoacoustics-based audio encoding method, including: receiving audio data and decoding the audio data; obtaining auditory feature information of a user, where the auditory feature information includes at least one of the following: personal information of the user, listening test result information of the user, or frequency response curve information of the user; calculating a psychoacoustics model parameter of the user based on the auditory feature information of the user; and encoding the decoded audio data based on the psychoacoustics model parameter of the user. The psychoacoustics model parameter includes at least one of the following: an intra-band masking parameter, a slope of a low-frequency inter-band masking line, a slope of a high-frequency inter-band masking line, or a human ear quiet threshold curve.

According to the psychoacoustics-based audio encoding method provided in this embodiment of this application, an electronic device receives audio data from another device and decodes the audio data. The electronic device calculates a psychoacoustics model parameter of the user based on obtained auditory feature information of the user, and re-encodes the psychoacoustics model parameter of the user. Because the auditory feature information of the user is related to a personalized auditory feature of the user and a hardware feature of a sound-making device, the psychoacoustics model parameter calculated based on the auditory feature information of the user has a personalized feature. Further, the decoded audio data is encoded based on the psychoacoustics model parameter of the user, so that a listening requirement of the user can be met, and sound quality experience of the user can be improved.

In a possible implementation, the obtaining auditory feature information of a user specifically includes: obtaining personal information input by the user in a user information input interface of the electronic device. The personal information of the user includes at least one of the following: gender information, age information, listening preference information, listening environment information, or working environment information of the user.

Optionally, the personal information of the user includes basic physiological information of the user, a living habit of the user, and the like. The listening preference information of the user reflects preferences of the user for different types of music, and the listening preference of the user includes but is not limited to bass, soprano, heavy bass, and the like. The listening environment information reflects a status of an environment in which the user is located when listening to the audio. Optionally, the listening environment of the user is but is not limited to noisy or quiet. For example, in a public occasion such as a subway or a bus, the listening environment of the user is noisy, and in an occasion such as home or an office, the listening environment of the user is quiet. The working environment information of the user reflects a status of an environment in which the user works for a long time. Optionally, the working environment of the user is also but is not limited to noisy or quiet.

It should be understood that an auditory characteristic of a user is related to personal information of the user. For different users, if personal information of the user is different, auditory feelings of the users for a sound are different, that is, auditory characteristics are different. For example, a female is more sensitive to a high-frequency sound than a male. Sensitivity of a user to a sound frequency decreases with age. Sensitivity of users with different listening preferences to sounds at different frequencies is different. Sensitivity of the user to sounds at different frequencies varies with listening environments. For example, when the user is on a noisy subway, the user is insensitive to sound, and the user may not hear a sound with low volume. Sensitivity of the user to sounds at different frequencies varies with working environments. For example, when the user works in a noisy environment for a long time, hearing of the user may be damaged. In this way, the user is insensitive to sound, and the user may not hear a sound with low volume.

In a possible implementation, the listening test result information includes quiet threshold test result information of the user and masking test result information of the user. The quiet threshold test result information includes human ear quiet thresholds corresponding to a plurality of frequency values. The masking test result information includes masking values corresponding to a plurality of frequency values in a masking frequency band. One mask frequency corresponds to one masking frequency band.

Optionally, a listening test is performed on the user by using test audio to obtain listening test result information. For example, the user may complete an audio test (or referred to as the listening test) on an electronic device, and the audio test includes a quiet threshold test and a masking test.

In a possible implementation, the obtaining auditory feature information of a user specifically includes: obtaining the plurality of frequency values input by the user in a first audio test interface of the electronic device; obtaining the human ear quiet thresholds of the user corresponding to the plurality of frequency values; and obtaining the quiet threshold test result information based on the plurality of frequency values input in the first audio test interface and the human ear quiet thresholds of the user corresponding to the plurality of frequency values. The human ear quiet threshold of the user represents a boundary energy value of test audio.

In this embodiment of this application, when energy of the test audio is greater than or equal to the boundary energy value of the test audio, the user can perceive the test audio. When the energy of the test audio is less than the boundary energy value of the test audio, the user cannot perceive the test audio. For different users, boundary energy values of the foregoing test audio may be different. In other words, for different users, human ear quiet thresholds of the users may be different.

The user tests a human ear quiet threshold corresponding to each frequency (24 Bark scales). Specifically, in the foregoing first audio test interface, the user slides a frequency adjustment button to fix a frequency of the test audio at a frequency, and then the user slides a volume adjustment button from low volume to high volume until the user can hear a sound of the test audio. In this case, a volume corresponding to the volume adjustment button is a boundary energy value of the test audio, that is, a human ear quiet threshold corresponding to the test audio. In this way, all of the foregoing 24 Bark scales are used by using a same test method, to respectively obtain human ear quiet thresholds corresponding to 24 frequencies. In this case, the human ear quiet thresholds corresponding to the plurality of frequency values are obtained.

In a possible implementation, the obtaining auditory feature information of a user specifically includes: obtaining the plurality of frequency values input by the user in a second audio test interface of the electronic device; obtaining the masking values corresponding to the plurality of frequency values; and obtaining the masking test result information based on the plurality of frequency values input in the second audio test interface and the masking values corresponding to the plurality of frequency values. The plurality of frequency values are a plurality of frequency values in the masking frequency band, and the masking value represents the boundary energy value of the test audio.

When the energy of the test audio is greater than or equal to the boundary energy value of the test audio, the user can perceive the test audio. When the energy of the test audio is less than the boundary energy value of the test audio, the user cannot perceive the test audio. The boundary energy values of the foregoing test audio may vary with different users. In other words, the foregoing masking values may vary with different users.

The user tests a masking value corresponding to each mask frequency (that is, 24 Bark scales). For example, in the foregoing second audio test interface, a masking test process is described by using an example in which masking test result information corresponding to one mask frequency value is tested, and specifically includes the following step 1 to step 2.

Step 1: The user slides a frequency adjustment button to fix a mask frequency of the test audio at a frequency value.

Step 2: The user slides the frequency adjustment button from a low frequency to a high frequency to fix the mask frequency at a frequency value, and then the user slides the volume adjustment button from low volume to high volume until the user can hear a sound of the test audio.

It should be understood that when the mask frequency is a frequency value, the volume is adjusted until the user can hear the sound of the test audio. In this case, the volume corresponding to the volume adjustment button is the masking value corresponding to the mask frequency. After using all 24 mask frequencies, the user obtains masking values corresponding to a plurality of mask frequencies, that is, obtains masking values corresponding to a plurality of frequency values in a masking frequency band.

It should be noted that, in step 2, in a process in which the user uses all the 24 mask frequencies, when the mask frequencies are at some frequency values, the user slides the volume adjustment button from the low volume to the high volume, and the user can always hear the sound of the test audio. In this case, there is no masking value at these mask frequencies. In other words, at these mask frequencies, the mask has no masking effect on the test audio. It should be understood that the mask frequency has a masking value at some frequency values. In other words, the user can obtain the masking value corresponding to the mask frequency by sliding the volume adjustment button from the low volume to the high volume. A plurality of mask frequencies having a masking value form a masking frequency band (a masking frequency band corresponding to the mask). In other words, in the masking frequency band, the mask has masking effect on the test audio.

Refer to the test methods in step 1 and step 2. The user uses all the foregoing 24 Bark scales for the mask frequencies, to respectively obtain masking values corresponding to the plurality of frequency values in the masking frequency band corresponding to the 24 mask frequencies.

In a possible implementation, the obtaining auditory feature information of a user specifically includes: receiving frequency response curve information of the user from an audio receiver.

The frequency response curve information of the user is received by the electronic device from an audio playing device (for example, a headset). The frequency response curve information of the user is related to a hardware characteristic of a sound-making device (for example, a speaker) of the audio playing device and an ear canal characteristic of the user. For example, in an active noise reduction headset, a feedback microphone (feedback mic) is disposed in an accessory of a speaker. When the user wears the headset to listen to a sound, the speaker may capture audio data played by the speaker in a process of playing test audio. In this embodiment of this application, audio data played by the speaker is referred to as first audio data, and audio data captured by the feedback microphone is referred to as second audio data. In this case, the frequency response curve information of the user reflects a curve of a ratio of an amplitude of a frequency domain signal obtained by performing Fourier transform on the second audio data to an amplitude of a frequency domain signal obtained by performing Fourier transform on the first audio data at each frequency.

In a possible implementation, the determining a psychoacoustics model parameter of the user based on the auditory feature information of the user specifically includes: determining, from a preset sample library based on the personal information of the user, a plurality of test samples that match the personal information of the user; performing fitting on quiet threshold test result information of the plurality of test samples, to obtain the human ear quiet threshold curve of the user; and performing fitting on masking test result information of the plurality of test samples, to obtain the intra-band masking parameter, the slope of the low-frequency inter-band masking line, and the slope of the high-frequency inter-band masking line of the user.

In this embodiment of this application, the electronic device pre-stores personal information of a large quantity of test samples (that is, a plurality of users, where the plurality of users form a sample library) and listening test result information of each test sample.

Optionally, a method for determining, by the electronic device from the sample library based on the personal information of the user, the plurality of test samples that match the personal information of the user includes: The electronic device matches the personal information of the user with the personal information in the sample library. A specific matching process is: The electronic device quantizes the personal information of the user to form a feature vector of the user, calculates an inner product of the feature vector of the user and the feature vector of the test sample in the sample library, and selects a test sample corresponding to a plurality of feature vectors whose inner product is greater than or equal to a first preset threshold as the test sample that matches the personal information of the user. It should be understood that a larger inner product of the feature vector of the user and the feature vector of the test sample in the sample library indicates that the two feature vectors are more similar. In other words, personal information of two users is more similar.

In an implementation, a square difference between the feature vector of the user and the feature vector of the test sample in the sample library may be further calculated. A smaller square difference indicates that the two feature vectors are more similar. Therefore, a test sample corresponding to a plurality of feature vectors whose square differences are less than or equal to a second preset threshold is selected as the test sample that matches the personal information of the user.

Optionally, a general function expression of the human ear quiet threshold curve is:

$$L(f) = a \times \left(\frac{f}{1000}\right)^{-0.8} + b \times \exp\left[-0.6\left(\frac{f}{1000} - 3.3\right)^2\right] + c \times \left(\frac{f}{1000}\right)^4$$

L(f) represents the human ear quiet threshold curve. f represents a frequency, a, b, and c are parameters of the human ear quiet threshold curve. Value ranges of the three parameters are $3 \leq a \leq 4$, $-0.7 \leq b \leq -0.6$, and $5 \times 10^{-4} \leq b \leq 2 \times 10^{-3}$.

In this embodiment of this application, performing fitting on quiet threshold test result information of the plurality of test samples specifically means determining a function expression of a human ear quiet threshold curve based on the quiet threshold test result information of the plurality of test samples, that is, solving parameters a, b, and c in the function expression. Optionally, based on quiet threshold test result information of a plurality of test samples, data fitting is performed by using a least square method, and parameters a, b, and c in an obtained function expression L(f) are solved, to obtain a human ear quiet threshold curve L(f).

Optionally, the electronic device obtains, based on the masking test result information of the plurality of test samples and by using a linear fitting method, a function of a low-frequency inter-band masking line and a function of a high-frequency inter-band masking line, to determine the slope of the low-frequency inter-band masking line and the slope of the high-frequency inter-band masking line. For example, the function of the low-frequency inter-band masking line is set to $y_1 = k_1 x_1 + b_1$. $x_1$ represents a frequency. $y_1$ represents a masking value corresponding to the frequency $x_1$. $k_1$ is the slope of the low-frequency inter-band masking line. $k_1 > 0$. $b_1$ is a parameter of the low-frequency inter-band masking line. $b_1$ is a real number. The function of the high-frequency inter-band masking line is set to $y_2 = k_2 x_2 + b_2$. $x_2$ represents a frequency. $y_2$ represents a masking value corresponding to the frequency $x_2$. $k_2$ is the slope of the high-frequency inter-band masking line. $k_2 < 0$. $b_2$ is a real number. It should be noted that, a rule of linear fitting is: enabling a sum of squares of distances from each data point to a corresponding line in the masking test result information of the test sample to be minimum, to obtain $k_1$, $b_1$, $k_2$, and $b_1$.

After $k_1$, $b_1$, $k_2$, and $b_2$ are obtained through the foregoing solution, an intersection point of the low-frequency inter-band masking line (that is, $y = k_1 x + b_1$) and the high-frequency inter-band masking line (that is, $y_2 = k_2 x_2 + b_2$) is further obtained, to determine the intra-band masking parameter. The intra-band masking parameter is a difference between energy of the mask and a masking value (that is, energy) corresponding to the intersection point.

The energy of the mask is calculated according to the following formula:

$$E = [X(f)]^2 + [X(f+1)]^2 + \ldots + [X(f+s)]^2$$

E represents the energy of the mask, X(f) represents a frequency domain value obtained after Fourier transform is performed on the audio data at a frequency f of the mask, and s represents a frequency domain width of a Butter spectrum in which the mask is located.

In this embodiment of this application, determining the psychoacoustics model parameter of the user based on the personal information of the user is more suitable for an auditory characteristic of the user. Further, the decoded audio data is encoded based on the psychoacoustics model parameter of the user, and the encoded audio data is sent to the audio receiver for decoding and then playing. In this way, the user can hear audio suitable for the auditory characteristic of the user, thereby significantly improving audio perceiving experience of the user.

In a possible implementation, the determining a psychoacoustics model parameter of a user based on the auditory feature information of the user specifically includes: performing fitting on quiet threshold test result information of the user, to obtain the human ear quiet threshold curve of the user; and performing fitting on masking test result information of the user, to obtain the intra-band masking parameter, the slope of the low-frequency inter-band masking line, and the slope of the high-frequency inter-band masking line of the user.

In this embodiment of this application, the psychoacoustics model parameter of the user is obtained through fitting based on listening test result information of the user. The psychoacoustics model parameter is related to a personalized auditory characteristic of the user and a hardware characteristic of the sound-making device. The psychoacoustics model parameter is more suitable for the auditory characteristic of the user. Further, the decoded audio data is encoded based on the psychoacoustics model parameter of the user, and the encoded audio data is sent to the audio receiver for decoding and then playing. In this way, the user can hear audio suitable for the auditory characteristic of the user, thereby significantly improving audio perceiving experience of the user.

In a possible implementation, the determining a psychoacoustics model parameter of the user based on the auditory feature information of the user specifically includes: determining, from a preset sample library based on the frequency response curve information of the user, a plurality of test samples that match the frequency response curve information of the user; performing fitting on quiet threshold test result information of the plurality of test samples, to obtain the human ear quiet threshold curve of the user; and performing fitting on masking test result information of the plurality of test samples, to obtain the intra-band masking parameter, the slope of the low-frequency inter-band masking line, and the slope of the high-frequency inter-band masking line of the user.

In this embodiment of this application, the electronic device pre-stores frequency response curve information of a large quantity of test samples (that is, a plurality of users, where the plurality of users form a sample library) and listening test result information of each test sample.

Optionally, a method for determining, by the electronic device from the preset sample library based on the frequency response curve information of the user, the plurality of test samples that match the frequency response curve information of the user includes: The electronic device matches the frequency response curve of the user with the frequency response curve information in the sample library. A specific matching process includes: The electronic device quantizes the frequency response curve information of the user to obtain a frequency response vector of the user, calculates an inner product of the frequency response vector of the user and a frequency response vector of a test sample in the sample library, and selects a test sample corresponding to a plurality of frequency response vectors whose inner product is greater than or equal to a third preset threshold as the test sample that matches the frequency response curve information of the user.

It should be understood that a larger inner product of the frequency response vector of the user and the frequency response vector of the test sample in the sample library indicates that the two frequency response vectors are more similar. In other words, frequency response curve information of two users is more similar.

In an implementation, a square difference between the frequency response vector of the user and the frequency response vector of the test sample in the sample library may be further calculated. Because a smaller square difference indicates that the two frequency response vectors are more similar, a test sample corresponding to a plurality of frequency response vectors whose square differences are less than or equal to a fourth preset threshold is selected as the test sample that match the frequency response curve information of the user.

In this embodiment of this application, the psychoacoustics model parameter of the user that is determined based on the frequency response curve information of the user is related to an ear canal structure of the user and the hardware characteristic of the sound-making device. The psychoacoustics model parameter is more suitable for the auditory characteristic of the user. Further, the decoded audio data is encoded based on the psychoacoustics model parameter of the user, and the encoded audio data is sent to the audio receiver for decoding and then playing. In this way, the user can hear audio suitable for the auditory characteristic of the user, thereby significantly improving audio perceiving experience of the user.

In a possible implementation, the determining a psychoacoustics model parameter of the user based on the auditory feature information of the user specifically includes: determining, based on at least two types of auditory feature information of the personal information of the user, the listening test result information of the user, and the frequency response curve information of the user, psychoacoustics model parameters respectively corresponding to the at least two types of auditory feature information; and performing weighted summation on the psychoacoustics model parameters respectively corresponding to the at least two types of auditory feature information, to obtain the psychoacoustics model parameter of the user. Specifically, weights are set for the psychoacoustics model parameters respectively corresponding to the at least two types of auditory feature information, and result information of the weighted summation is used as the psychoacoustics model parameter of the user.

Alternatively, in an implementation, priorities are set for the psychoacoustics model parameters respectively corresponding to the at least two types of auditory feature information. A psychoacoustics model parameter corresponding to one type of auditory feature information with a higher priority is used as the psychoacoustics model parameter of the user. For example, the auditory feature information includes the personal information of the user and listening test result information of the user. Because the psychoacoustics model parameter of the user determined based on the listening test result information of the user is more suitable for the auditory characteristic of the user, the priority of the psychoacoustics model parameter corresponding to the listening test result information of the user is set to be higher than the priority of the psychoacoustics model parameter corresponding to the personal information of the user. Therefore, the psychoacoustics model parameter corresponding to the listening test result information of the user is used as the psychoacoustics model parameter of the user. For another example, the auditory feature information includes the listening test result information of the user and the frequency response curve information of the user. Similarly, a priority of a psychoacoustics model parameter corresponding to the listening test result information of the user is set to be higher than a priority of a psychoacoustics model parameter corresponding to the frequency response curve information of the user. Therefore, the psychoacoustics model parameter corresponding to the listening test result information of the user is used as the psychoacoustics model parameter of the user.

In this embodiment of this application, the psychoacoustics model parameter of the user is determined by performing weighted summation on the psychoacoustics model parameters respectively corresponding to the at least two types of auditory feature information of the user, so that accuracy of the psychoacoustics model parameter of the user can be further improved. The decoded audio data is encoded based on the psychoacoustics model parameter of the user, and the encoded audio data is sent to the audio receiver for decoding and then playing. In this way, the user can hear audio suitable for the auditory characteristic of the user, thereby significantly improving audio perceiving experience of the user.

In a possible implementation, the psychoacoustics model parameter includes a psychoacoustics model parameter corresponding to at least one subband. The psychoacoustics model parameter corresponding to the subband includes at least one of the following: an intra-band masking parameter of the subband, a slope of a low-frequency inter-band masking line of the subband, a slope of a high-frequency inter-band masking line of the subband, or a human ear quiet threshold curve of the subband.

In a possible implementation, the encoding the decoded audio data based on the psychoacoustics model parameter of the user includes: determining, based on the psychoacoustics model parameter of the user, information that can be perceived by the user and information that cannot be perceived by the user in the decoded audio data; and encoding the information that can be perceived by the user in the decoded audio data.

The information that cannot be perceived by the user in the decoded audio data is not encoded.

Specifically, it is determined, based on the human ear quiet threshold curve of the user, that in the audio data, information less than the human ear quiet threshold in the human ear quiet threshold curve is information that cannot be perceived by the human ear, and information greater than or equal to the human ear quiet threshold is information that can be perceived by the human ear. It can be determined, based on the slope of the low-frequency inter-band masking line, the slope of the high-frequency inter-band masking line, and the intra-band masking parameter, that in the masking frequency band, information less than the masking value in the audio data is information that cannot be perceived by a human ear, and information that is greater than or equal to the masking value is information that can be perceived by a human ear.

It should be understood that the electronic device divides decoded audio data into at least one subband (that is, one or more subbands), and then separately encodes the at least one subband based on a psychoacoustics model parameter corresponding to each of the at least one subband.

Standards for encoding the audio data based on the psychoacoustics model parameter may include AAC, MP3, and the like. In this embodiment of this application, an encoding standard may be selected based on an actual use requirement to encode the decoded audio data.

In this embodiment of this application, AAC is used as an example to briefly describe a process of encoding the decoded audio data. First, raw audio data (Audio Input) is converted from time domain to frequency domain through time-frequency conversion. Then, information that can be perceived by the user and information that cannot be perceived in a transformed frequency domain signal is determined based on the foregoing four determined psychoacoustics model parameters. The information that can be perceived by the user is quantized, and the information that cannot be perceived by the user is not quantized. Further, noise-free encoding (for example, Huffman noise-free encoding or arithmetic noise-free encoding) is performed on the quantized information. Finally, the electronic device packs the encoded audio data into a bitstream and sends the bitstream to an audio receiver (that is, an audio decoder).

According to a second aspect, an embodiment of this application provides an audio encoding apparatus, including a receiving module, a decoding module, an obtaining module, a determining module, and an encoding module. The receiving module is configured to receive audio data. The decoding module is configured to decode the audio data. The obtaining module is configured to obtain auditory feature information of a user. The auditory feature information includes at least one of the following: personal information of the user, listening test result information of the user, or frequency response curve information of the user. The determining module is configured to calculate a psychoacoustics model parameter of the user based on the auditory feature information of the user. The psychoacoustics model parameter includes at least one of the following: an intra-band masking parameter, a slope of a low-frequency inter-band masking line, a slope of a high-frequency inter-band masking line, or a human ear quiet threshold curve. The encoding module is configured to encode the decoded audio data based on the psychoacoustics model parameter of the user.

In a possible implementation, the obtaining module is specifically configured to obtain personal information input by the user in a user information input interface of an electronic device. The personal information of the user includes at least one of the following: gender information, age information, listening preference information, listening environment information, or working environment information of the user.

In a possible implementation, the listening test result information includes quiet threshold test result information of the user and masking test result information of the user. The quiet threshold test result information includes human ear quiet thresholds corresponding to a plurality of frequency values. The masking test result information includes masking values corresponding to a plurality of frequency values in a masking frequency band. One mask frequency corresponds to one masking frequency band.

In a possible implementation, the obtaining module is specifically configured to: obtain the plurality of frequency values input by the user in a first audio test interface of the electronic device, obtain the human ear quiet thresholds of the user corresponding to the plurality of frequency values, and obtain the quiet threshold test result information based on the plurality of frequency values input in the first audio test interface and the human ear quiet thresholds of the user corresponding to the plurality of frequency values, where the human ear quiet threshold of the user represents a boundary energy value of test audio, obtain the plurality of frequency values input by the user in a second audio test interface of the electronic device, obtain the masking values corresponding to the plurality of frequency values, and obtain the masking test result information based on the plurality of frequency values input in the second audio test interface and the masking values corresponding to the plurality of frequency values. The plurality of frequency values are a plurality of frequency values in the masking frequency band, and the masking value represents the boundary energy value of the test audio. When the energy of the test audio is greater than or equal to the boundary energy value of the test audio, the user can perceive the test audio.

In a possible implementation, the determining module is specifically configured to: determine, from a preset sample library based on the personal information of the user, a plurality of test samples that match the personal information of the user, perform fitting on quiet threshold test result information of the plurality of test samples, to obtain the human ear quiet threshold curve of the user, and perform fitting on masking test result information of the plurality of test samples, to obtain the intra-band masking parameter, the slope of the low-frequency inter-band masking line, and the slope of the high-frequency inter-band masking line of the user.

In a possible implementation, the determining module is specifically configured to: perform fitting on quiet threshold test result information of the user, to obtain the human ear quiet threshold curve of the user, and perform fitting on masking test result information of the user, to obtain the intra-band masking parameter, the slope of the low-frequency inter-band masking line, and the slope of the high-frequency inter-band masking line of the user.

In a possible implementation, the determining module is specifically configured to: determine, from the preset sample library based on the frequency response curve information of the user, a plurality of test samples that match the frequency response curve information of the user, perform fitting on quiet threshold test result information of the plurality of test samples, to obtain the human ear quiet threshold curve of the user, and perform fitting on masking test result information of the plurality of test samples, to obtain the intra-band masking parameter, the slope of the low-frequency inter-band masking line, and the slope of the high-frequency inter-band masking line of the user.

In a possible implementation, the determining module is specifically configured to: calculate, based on at least two types of auditory feature information of the personal information of the user, the listening test result information of the user, and the frequency response curve information of the user, psychoacoustics model parameters respectively corresponding to the at least two types of auditory feature information, and perform weighted summation on the psychoacoustics model parameters respectively corresponding to the at least two types of auditory feature information, to obtain the psychoacoustics model parameter of the user.

In a possible implementation, the psychoacoustics model parameter includes a psychoacoustics model parameter corresponding to at least one subband. The psychoacoustics model parameter corresponding to the subband includes at least one of the following: an intra-band masking parameter of the subband, a slope of a low-frequency inter-band masking line of the subband, a slope of a high-frequency inter-band masking line of the subband, or a human ear quiet threshold curve of the subband.

In a possible implementation, the encoding module is specifically configured to: determine, based on the psychoacoustics model parameter of the user, information that can be perceived by the user and information that cannot be perceived by the user in the decoded audio data, and encode the information that can be perceived by the user in the decoded audio data. It should be understood that the information that cannot be perceived by the user in the decoded audio data is not encoded.

According to a third aspect, an embodiment of this application provides an electronic device, including a memory and at least one processor connected to the memory. The memory is configured to store instructions, and after the instructions are read by the at least one processor, the electronic device performs the method in any one of the first aspect and the possible implementations of the first aspect.

According to a fourth aspect, an embodiment of this application provides a computer-readable storage medium, configured to store computer software instructions used by the foregoing electronic device. The computer readable storage medium includes a program designed for performing the first aspect or any possible implementation of the first aspect.

According to a fifth aspect, an embodiment of this application provides a computer program product including instructions. When the computer program product is run on a computer, the computer is enabled to perform the method in the first aspect or any possible implementation of the first aspect.

According to a sixth aspect, an embodiment of this application provides a chip, including a memory and a processor. The memory is configured to store computer instructions. The processor is configured to invoke the computer instructions from the memory and run the computer instructions, to perform the method in any one of the first aspect and the possible implementations of the first aspect.

DESCRIPTION OF EMBODIMENTS

Figure 1:
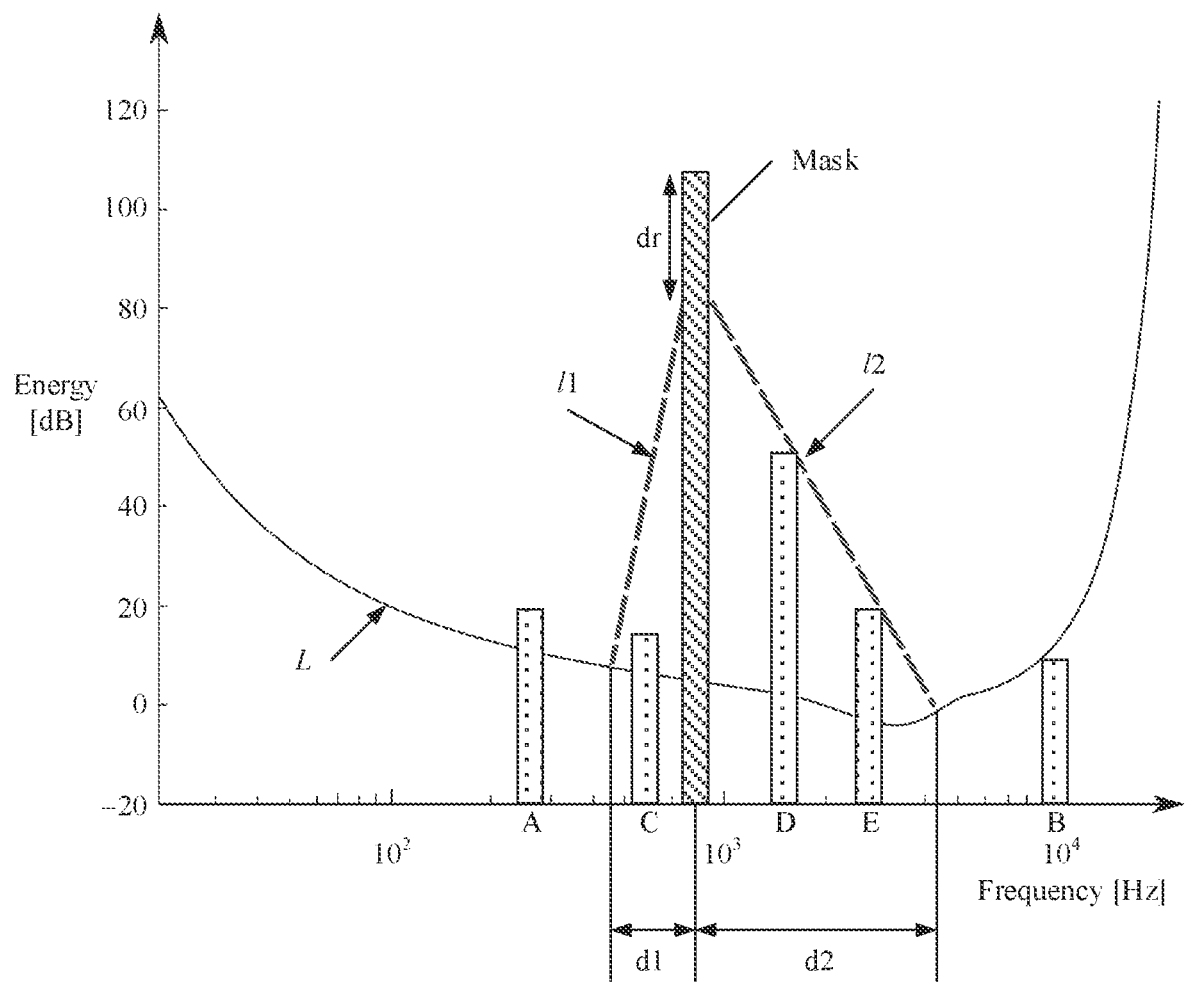
FIG. 1 is a schematic diagram of a psychoacoustics model parameter according to an embodiment of this application.

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first preset threshold, a second preset threshold, and the like are used to distinguish between different preset thresholds, but are not used to describe a particular order of preset thresholds. A first audio test interface, a second audio test interface, and the like are used to distinguish between different audio test interfaces, but are not used to describe a particular order of audio test interfaces.

In addition, in embodiments of this application, the word "exemplary" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the term "example". "for example", or the like is intended to present a relative concept in a specific manner.

In the description of the embodiment of this application, unless otherwise stated, "multiple" means two or more than two. For example, a plurality of processing units refer to two or more processing units, and a plurality of systems refer to two or more systems.

First, some concepts related to the psychoacoustics-based audio encoding method and apparatus provided in embodiments of this application are explained and described.

Psychoacoustics is a subject that studies the relationship between sound and sound-induced hearing. Psychoacoustics models are usually used to describe a relationship between sound and sound-induced hearing. The psychoacoustics model is a mathematical expression model based on a physiological structure of a human auditory organ and a statistical property of a perception mode on human auditory feeling, and can explain physiological principles of various human auditory feelings.

Masking effect is a subjective feeling of the human ear's auditory psychology. It is a phenomenon that the human ear blocks the auditory perception of the sound at some frequencies. For example, when two people are listened to at the same time, one person speaks at high volume, and the other person speaks at low volume. A listener may hear only a voice of the person with the high volume, and cannot hear a voice of the person with the low volume, that is, the sound with the higher volume masks the sound with the lower volume.

In this embodiment of this application, the masking effect of the human ear can be analyzed by using the psychoacoustics model. To be specific, which information in a section of audio is perceivable information and which information is unperceivable information can be determined based on the psychoacoustics model. Unperceivable information is masked information. The masking effect mainly depends on a set of parameters of the psychoacoustics model, and each frequency of the audio data corresponds to a set of psychoacoustics model parameters. A specific principle of encoding the audio data by using the psychoacoustics model is: determining, based on the psychoacoustics model parameter, unperceivable information and perceivable information in to-be-encoded audio, encoding the perceivable information, and skipping encoding the unperceivable information.

It should be understood that perceivable information in the to-be-encoded audio refers to information that can be heard by the user, and unperceivable information refers to information that cannot be heard by the user. The information that can be heard by the user is encoded, and the information that cannot be heard by the user is not encoded, so that an auditory requirement of the user can be met, and overheads of audio encoding can be reduced to some extent.

Generally, when audio data encoding is performed based on a psychoacoustics model, the audio data is divided into a plurality of subbands (one subband refers to one frequency band of the audio data). A group of psychoacoustics model parameters are determined for each subband. Then, the subband is encoded based on the psychoacoustics model parameter corresponding to each subband, to complete encoding of a section of audio data.

In this embodiment of this application, a psychoacoustics model parameter corresponding to a subband includes at least one of the following: an intra-band masking parameter, a slope of a low-frequency inter-band masking line, a slope of a high-frequency inter-band masking line, or a human ear quiet threshold curve. FIG. 1 is a schematic diagram of a psychoacoustics model parameter. As shown in FIG. 1, one frequency band is used as an example. The foregoing four psychoacoustics model parameters are respectively an intra-band masking parameter dr, a slope $k_1$ of a low-frequency inter-band masking line l1, a slope $k_2$ of a high-frequency inter-band masking line l2, and a human ear quiet threshold curve L. Specifically, the frequency band corresponds to a mask. The mask refers to audio information with highest energy in the frequency band. Energy of the mask determines values of the foregoing four parameters.

Refer to FIG. 1. The human ear quiet threshold curve is used to reflect a human ear quiet threshold of the user at each frequency in a process in which the user listens to a section of audio under the action of the mask. The human ear quiet threshold of the user represents a boundary energy value of the audio, and boundary energy values corresponding to different users may be different. The human ear quiet threshold curve is determined by a plurality of frequency values and a plurality of human ear quiet thresholds corresponding to the plurality of frequency values. It should be understood that when the energy of the audio is greater than or equal to the boundary energy value of the audio, the user can perceive the audio (that is, the user can hear the audio). When the energy of the audio is less than the energy value of the audio, the user cannot perceive the audio (that is, the user cannot hear the audio). Using a frequency of 3 kHz of audio in FIG. 1 as an example, a boundary energy value corresponding to the user is 0 dB. When the energy of the audio is less than 0 dB, the user cannot hear the audio. When the energy of the audio is greater than or equal to 0 dB, the user can hear the audio. For example, information corresponding to a frequency band A in FIG. 1 can be perceived by a human ear, and information corresponding to a frequency band B cannot be perceived by a human ear.

For a mask, the low-frequency inter-band masking line is a masking line corresponding to one frequency band less than the mask frequency, and the high-frequency inter-band masking line is a masking line corresponding to one frequency band greater than the mask frequency. It should be noted that the slope of the low-frequency inter-band masking line is greater than 0, and the slope of the high-frequency inter-band masking line is less than 0. [00%] In this embodiment of this application, an energy value corresponding to a masking line (including a low-frequency inter-band masking line and a high-frequency inter-band masking line) is referred to as a masking value. Each frequency in the frequency band corresponding to the masking line corresponds to a masking value. The masking value represents the boundary energy value of the audio. When the energy of the audio is greater than or equal to the boundary energy value of the audio, the user can perceive the audio. When the energy of the audio is less than the boundary energy value of the audio, the user cannot perceive the audio.

For example, in FIG. 1, a frequency band corresponding to the low-frequency inter-band masking line l1 is a frequency band from a frequency corresponding to an intersection point of the low-frequency inter-band masking line l1 and the human ear quiet threshold curve L to a center frequency of the mask. A frequency band corresponding to the low-frequency inter-band masking line l1 is referred to as a low-frequency masking frequency band d1. In the low-frequency masking frequency band d1, information that is in the audio and whose energy is less than a corresponding masking value is information that cannot be perceived by a human ear. For example, information corresponding to a frequency band C in FIG. 1 cannot be perceived by a human ear. Similarly, a frequency band corresponding to the high-frequency inter-band masking line l2 is a frequency band from a frequency corresponding to an intersection point of the high-frequency inter-band masking line l2 and the human ear quiet threshold curve L to the center frequency of the mask. A frequency band corresponding to the high-frequency inter-band masking line l2 is referred to as a high-frequency masking frequency band d2. In the high-frequency masking frequency band d2, information that is in the audio and whose energy is less than a corresponding masking value is information that cannot be perceived by a human ear. For example, information corresponding to the frequency band D and a frequency band E in FIG. 1 cannot be perceived by a human ear.

It should be noted that, in this embodiment of this application, a frequency band including the low-frequency masking frequency band d1 and the high-frequency inter-band masking frequency band d2 is uniformly referred to as a masking frequency band.

Based on a problem existing in a conventional technology, embodiments of this application provide a psychoacoustics-based audio encoding method and apparatus. After the electronic device receives the audio data and decodes the audio data, the electronic device obtains the auditory feature information of the user, calculates the psychoacoustics model parameter of the user based on the auditory feature information of the user, and encodes the decoded audio data based on the psychoacoustics model parameter of the user. The auditory feature information of the user includes at least one of the following: personal information of the user, listening test result information of the user, and frequency response curve information of the user. The psychoacoustics model parameter of the user includes at least one of the following: an intra-band masking parameter, a slope of a low-frequency inter-band masking line, a slope of a high-frequency inter-band masking line, or a human ear quiet threshold curve. In this embodiment of this application, an electronic device receives audio data from another device and decodes the audio data. The electronic device calculates a psychoacoustics model parameter of the user based on obtained auditory feature information of the user, and re-encodes the psychoacoustics model parameter of the user. Because the auditory feature information of the user is related to a personalized auditory feature of the user and a hardware feature of a sound-making device, the psychoacoustics model parameter calculated based on the auditory feature information of the user has a personalized feature. Further, the decoded audio data is encoded based on the psychoacoustics model parameter of the user, so that a listening requirement of the user can be met, and sound quality experience of the user can be improved.

Figure 2:
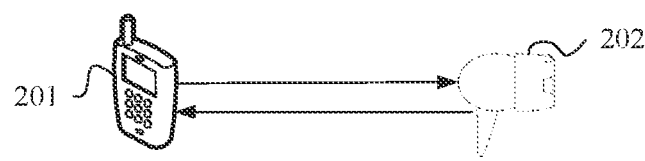
FIG. 2 is a schematic diagram of an application scenario of a psychoacoustics model-based encoding method according to an embodiment of this application.

FIG. 2 is a schematic diagram of an application scenario of a psychoacoustic-based audio encoding method and apparatus according to an embodiment of this application. In FIG. 2, an electronic device 201 communicates with an electronic device 202 in a wireless transmission manner. For example, the electronic device 201 communicates with the electronic device 202 through Bluetooth, or communicates with the electronic device 202 through another wireless network. It should be understood that this embodiment of this application relates to audio data transmission between the electronic device 201 and the electronic device 202. The electronic device 201 is an audio transmit end, and the electronic device 202 is an audio receiver. Specifically, after receiving the audio data from another device, the electronic device 201 decodes the audio data, calculates a psychoacoustics model parameter of the user based on the auditory feature information of the user, determines information that does not need to be encoded and information that needs to be encoded in the decoded audio data based on the psychoacoustics model parameter of the user, and encodes the information that needs to be encoded. It should be understood that herein, the information that does not need to be encoded is information that cannot be perceived by the user, and the information that needs to be encoded is information that can be perceived by the user. After re-encoding the decoded audio data, the electronic device 201 sends the encoded audio data to the electronic device 202. After receiving the audio, the electronic device 202 decodes and plays the audio.

Optionally, the electronic device 201 (that is, an audio transmit end, also an audio encoding end) in FIG. 2 may be an electronic device such as a mobile phone, a computer (for example, a notebook computer or a desktop computer), or a tablet computer (a handheld tablet computer or an in-vehicle tablet computer). The electronic device 202 in FIG. 2 may be a headset, for example, a true wireless stereo (TWS) headset, a wireless head mounted headset, a wireless neck ring headset, a common wireless in-ear headset, or a wireless bone conduction Bluetooth headset. Alternatively, the electronic device 202 may be another terminal device, for example, a smart speaker, a smartwatch, smart glasses, or an in-vehicle speaker. Specific types, structures, and the like of the electronic device 201 and the electronic device 202 are not limited in this embodiment of this application.

In this embodiment of this application, an example in which the electronic device 201 and the electronic device 202 send audio through Bluetooth is used to describe a psychoacoustic-based audio encoding process. It should be understood that both the electronic device 201 and the electronic device 202 support a Bluetooth function, and audio is sent after a wireless Bluetooth connection is established between the electronic device 201 and the electronic device 202.

Figure 3:
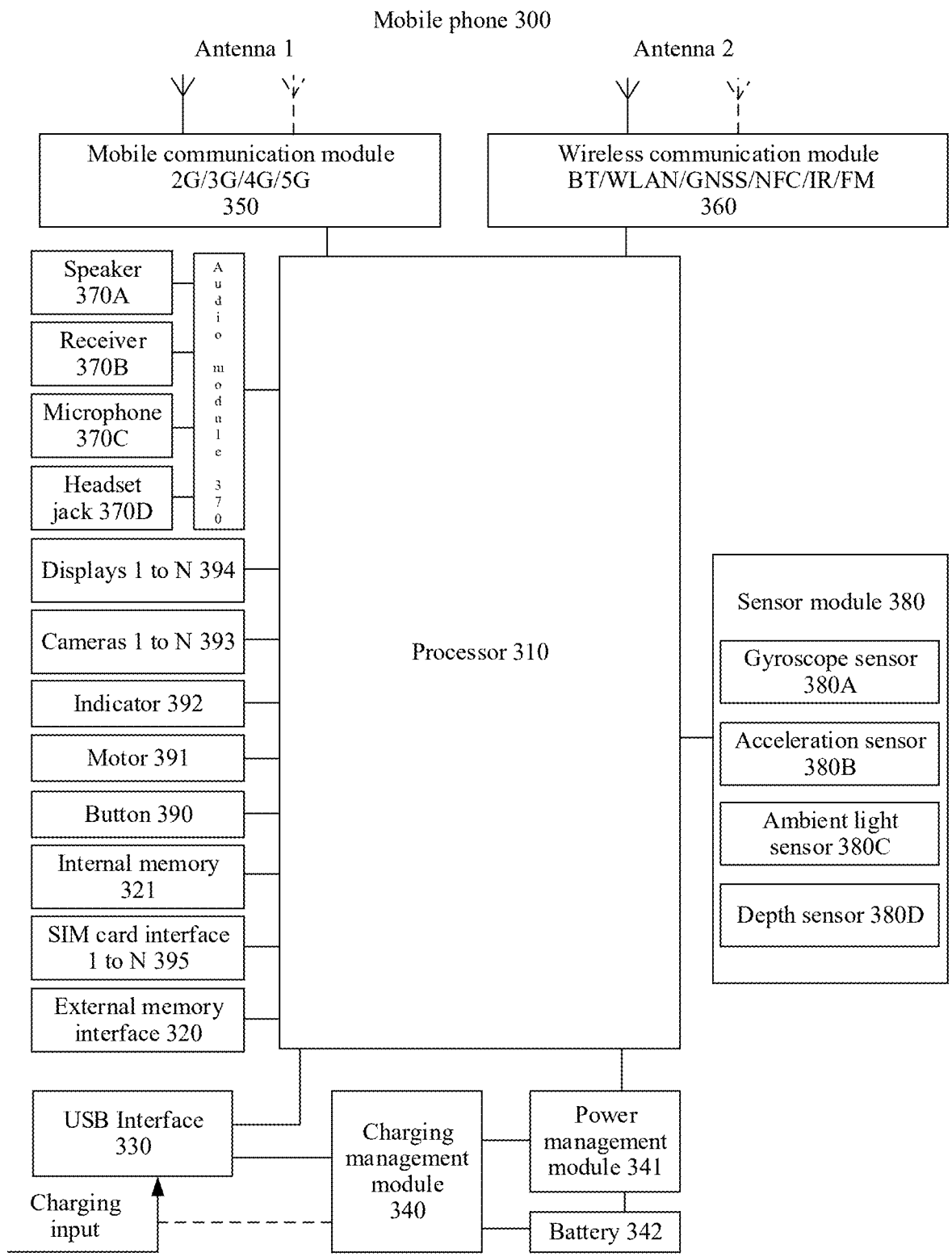
FIG. 3 is a schematic diagram of a hardware structure of a mobile phone according to an embodiment of this application.

For example, the electronic device 201 (that is, the audio transmit end or the audio encoding end) shown in FIG. 2 is a mobile phone. FIG. 3 is a schematic diagram of a hardware structure of a mobile phone according to an embodiment of this application. As shown in FIG. 3, a mobile phone 300 includes a processor 310, a memory (including an external memory interface 320 and an internal memory 321), a universal serial bus (USB) interface 330, a charging management module 340, a power management module 341, a battery 342, an antenna 1, an antenna 2, a mobile communication module 350, a wireless communication module 360, an audio module 370, a speaker 370A, a receiver 370B, a microphone 370C, a headset jack 370D, a sensor module 380, a button 390, a motor 391, an indicator 392, a camera 393, a display 394, a subscriber identification module (SIM) card interface 395, and the like. The sensor module 380 may include a gyroscope sensor 380A, an acceleration sensor 380B, an ambient light sensor 380C, a depth sensor 380D, a magnetic sensor, a pressure sensor, a distance sensor, a proximity sensor, a heart rate sensor, a barometric pressure sensor, a fingerprint sensor, a temperature sensor, a touch sensor, a bone conduction sensor, and the like.

It may be understood that a structure illustrated in this embodiment of this application does not constitute a specific limitation on the mobile phone 300. In some other embodiments of this application, the mobile phone 300 may include more or fewer components than components shown in the figure, or some components may be combined, or some components may be split, or there may be a different component arrangement. The components shown in the figure may be implemented by hardware, software, or a combination of software and hardware.

The processor 310 may include one or more processing units. For example, the processor 310 may include an application processor (AP), a modem processor, a graphics processing unit (GPU), an image signal processor (ISP), a controller, a memory, a video or audio codec, a digital signal processor (DSP), a baseband processor, a neural-network processing unit (NPU), and/or the like. Different processing units may be independent components, or may be integrated into one or more processors.

The controller may be a nerve center and a command center of the mobile phone 300. The controller may generate an operation control signal based on an instruction operation code and a time sequence signal, to complete control of instruction reading and instruction execution.

A memory may be further disposed in the processor 310, and is configured to store instructions and data. In some embodiments, the memory in the processor 310 is a cache. The memory may store instructions or data just used or cyclically used by the processor 310. If the processor 310 needs to use the instructions or the data again, the processor may directly invoke the instructions or the data from the memory. This avoids repeated access and reduces waiting time of the processor 310. Therefore, system efficiency is improved.

In some embodiments, the processor 310 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 310 may include a plurality of groups of I2C buses. The processor 310 may be separately coupled to the touch sensor, a charger, a flash, the camera 393, and the like through different I2C bus interfaces. For example, the processor 310 may be coupled to the touch sensor through the I2C interface, so that the processor 310 communicates with the touch sensor through the I2C bus interface to implement a touch function of the mobile phone 300.

The I2S interface may be configured to perform audio communication. In some embodiments, the processor 310 may include a plurality of groups of I2S buses. The processor 310 may be coupled to the audio module 370 through the I2S bus, to implement communication between the processor 310 and the audio module 370. In some embodiments, the audio module 370 may send an audio signal to the wireless communication module 360 through the I2S interface, to implement a function of answering a call through a Bluetooth headset.

The PCM interface may also be used to perform audio communication, and sample, quantize, and code an analog signal. In some embodiments, the audio module 370 may be coupled to the wireless communication module 360 through the PCM bus interface. In some embodiments, the audio module 370 may also transmit an audio signal to the wireless communication module 360 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 310 to the wireless communication module 360. For example, the processor 310 communicates with a Bluetooth module in the wireless communication module 360 through the UART interface, to implement a Bluetooth function. In some embodiments, the audio module 370 may transmit an audio signal to the wireless communication module 360 through the UART interface, to implement a function of playing music through a Bluetooth headset.

The MIPI interface may be configured to connect the processor 310 to a peripheral component such as the display 394 or the camera 393. The MIPI interface includes a camera serial interface (CSI), a display serial interface (DSI), and the like. In some embodiments, the processor 310 communicates with the camera 393 through the CSI interface, to implement a photographing function of the mobile phone 300. The processor 310 communicates with the display 394 through the DSI interface, to implement a display function of the mobile phone 300.

The GPIO interface may be configured by software. The GPIO interface may be configured as a control signal or a data signal. In some embodiments, the GPIO interface may be configured to connect the processor 310 to the camera 393, the display 394, the wireless communication module 360, the audio module 370, the sensor module 380, and the like. The GPIO interface may alternatively be configured as an I2C interface, an I2S interface, a UART interface, an MIPI interface, or the like.

It may be understood that an interface connection relationship between the modules shown in this embodiment of this application is merely an example for description, and does not constitute a limitation on the structure of the mobile phone 300. In some other embodiments of this application, the mobile phone 300 may alternatively use an interface connection manner different from that in the foregoing embodiment, or use a combination of a plurality of interface connection manners.

The charging management module 340 is configured to receive a charging input from the charger. The power management module 341 is configured to connect the battery 342 and the charging management module 340 to the processor 310. The power management module 341 receives an input of the battery 342 and/or the charging management module 340, and supplies power to the processor 310, the internal memory 321, the display 394, the camera 393, the wireless communication module 360, and the like. The power management module 341 may be further configured to monitor parameters such as a battery capacity, a battery cycle count, and a battery health status (electric leakage or impedance).

A wireless communication function of the mobile phone 300 may be implemented by using the antenna 1, the antenna 2, the mobile communication module 350, the wireless communication module 360, the modem processor, the baseband processor, and the like.

The antenna 1 and the antenna 2 are configured to transmit and receive an electromagnetic wave signal. Each antenna in the mobile phone 300 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 350 may provide a solution, applied to the mobile phone 300, to wireless communication including 2G, 3G, 4G, 5G, and the like. The mobile communication module 350 may include at least one filter, a switch, a power amplifier, a low noise amplifier (LNA), and the like. The mobile communication module 350 may receive an electromagnetic wave by using the antenna 1, perform processing such as filtering or amplification on the received electromagnetic wave, and transmit the electromagnetic wave to the modem processor for demodulation. The mobile communication module 350 may further amplify a signal modulated by the modem processor, and convert the signal into an electromagnetic wave for radiation by using the antenna 1. In some embodiments, at least some functional modules in the mobile communication module 350 may be disposed in the processor 310. In some embodiments, at least some functional modules in the mobile communication module 350 and at least some modules in the processor 310 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 370A, the receiver 370B, or the like), or displays an image or video through the display 394. In some embodiments, the modem processor may be an independent component. In some other embodiments, the modem processor may be independent of the processor 310, and is disposed in a same device as the mobile communication module 350 or another functional module.

The wireless communication module 360 may provide wireless communication solutions including a wireless local area network (WLAN) (for example, a Wi-Fi network), Bluetooth (BT), a global navigation satellite system (GNSS), frequency modulation (FM), a near field communication (NFC) technology, and an infrared (IR) technology, applied to the mobile phone 300. The wireless communication module 360 may be one or more components integrating at least one communication processing module. The wireless communication module 360 receives an electromagnetic wave by using the antenna 2, performs frequency modulation and filtering processing on the electromagnetic wave signal, and sends a processed signal to the processor 310. The wireless communication module 360 may further receive a to-be-sent signal from the processor 310, perform frequency modulation and amplification on the signal, and convert the signal into an electromagnetic wave for radiation by using the antenna 2.

In some embodiments, the antenna 1 of the mobile phone 300 is coupled to the mobile communication module 350, and the antenna 2 is coupled to the wireless communication module 360, so that the mobile phone 300 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), new radio (NR), BT, GNSS, WLAN, NFC, FM, an IR technology, and/or the like.

The mobile phone 300 implements a display function by using the GPU, the display 394, the application processor, and the like. The GPU is a microprocessor for image processing, and is connected to the display screen 394 and the application processor. The GPU is configured 27, to: perform mathematical and geometric computation, and render an image. In this embodiment of this application, the GPU may be configured to perform three-dimensional model rendering and virtual-physical superposition. The processor 310 may include one or more GPUs that execute program instructions to generate or change display information.

The display screen 394 is configured to display an image, a video, and the like. In this embodiment of this application, the display screen 394 may be configured to display an image obtained after virtual-physical superposition. The display screen 394 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the mobile phone 300 may include one or N displays 394, where N is a positive integer greater than 1.

The mobile phone 300 may implement a photographing function by using the ISP, the camera 393, the video codec, the GPU, the display 394, the application processor, and the like.

The ISP is configured to process data fed back by the camera 393. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 393.

The camera 393 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the mobile phone 300 may include one or N cameras 393, where N is a positive integer greater than 1.

The digital signal processor is configured to process a digital signal, for example, process a digital image signal or a digital audio signal, and may further process another digital signal. For example, when the mobile phone 300 selects a frequency, the digital signal processor is configured to perform Fourier transform on frequency energy, and the like.

The video or audio codec is used to compress or decompress digital video or audio. The mobile phone 300 may support one or more audio codecs, for example, an SBC tacitly recognized by the advanced audio distribution profile (A2DP), and an encoder of an advanced audio encoding (AAC) series of the moving picture experts group (MPEG). In this way, the mobile phone 300 may play or record audio in a plurality of encoding formats.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the mobile phone 300, such as image recognition, facial recognition, speech recognition, text understanding, and action generation can be implemented by using the NPU.

The external memory interface 320 may be configured to connect to an external storage card such as a micro SD card, to extend a storage capability of the mobile phone 300. The external storage card communicates with the processor 310 through the external memory interface 320, to implement a data storage function.

The internal memory 321 may be configured to store computer-executable program code. The executable program code includes instructions. The internal memory 321 may include a program storage area and a data storage area. The program storage area may store an operating system, an application required by at least one function (for example, a voice playing function or an image playing function), and the like. The data storage area may store data (such as audio data and an address book) created during use of the mobile phone 300, and the like. In addition, the internal memory 321 may include a high-speed random access memory, and may further include a nonvolatile memory, for example, at least one magnetic disk storage device, a flash storage device, or a universal flash storage (UFS). The processor 310 runs the instructions stored in the internal memory 321 and/or the instructions stored in the memory disposed in the processor, to execute various function applications of the mobile phone 300 and data processing.

In addition, the mobile phone 300 may implement an audio function such as music playing or recording through the audio module 370, the speaker 370A, the receiver 370B, the microphone 370C, the headset jack 370D, the application processor. For example, the audio function includes music playing, recording, and the like.

The audio module 370 is configured to convert digital audio information into an analog audio signal for output, and is also configured to convert an analog audio input into a digital audio signal. The audio module 370 may be further configured to code and decode audio signals.

The speaker 370A, also referred to as a "speaker", is configured to convert an audio electrical signal into a sound signal. The mobile phone 300 may listen to music or answer a hands-free call by using the speaker 370A.

The telephone receiver 370B, also referred to as an "earpiece", is configured to convert an audio electrical signal into a sound signal. When a call is answered or voice information is received by using the mobile phone 300, the receiver 370B may be put close to a human ear to listen to a voice.

The microphone 370C, also referred to as a "mike" or a "mic", is configured to convert a sound signal into an electrical signal. When making a call or sending a voice message, a user may place the mouth of the user near the microphone 370C to make a sound, to input a sound signal to the microphone 370C. At least one microphone 370 (may be disposed in the mobile phone 300. In some other embodiments, two microphones 370C may be disposed in the mobile phone 300. In addition to collecting a sound signal, a noise reduction function (the microphone with the noise reduction function is a feedback microphone) may be further implemented. In some other embodiments, three, four, or more microphones 370C may alternatively be disposed in the mobile phone 300, to collect a sound signal, reduce noise, further identify a sound source, implement a directional recording function, and the like.

The gyroscope sensor 380A may be configured to determine a motion posture of the mobile phone 300. In some embodiments, the gyroscope sensor 380A may be used to determine angular velocities of the mobile phone 300 around three axes (namely, x, y, and z axes).

The acceleration sensor 380B may detect a movement direction and a movement acceleration of the mobile phone 300. When the mobile phone 300 is still, a value and a direction of gravity may be detected. The acceleration sensor 380B may be further configured to identify a posture of the mobile phone 300, and is applied to an application such as switching between landscape mode and portrait mode or a pedometer.

The ambient light sensor 380C is configured to sense ambient light brightness. The mobile phone 300 may adaptively adjust luminance of the display 394 based on the sensed luminance of the ambient light. The ambient light sensor 380C may also be configured to automatically adjust white balance during photographing. In some embodiments, the ambient light sensor 380C may further cooperate with a proximity sensor to detect whether the mobile phone 300 is in a pocket, to prevent an accidental touch.

The depth sensor 380D is configured to determine a distance from each point on the object to the mobile phone 300. In some embodiments, the depth sensor 380D may collect depth data of the target object, to generate a depth map of the target object. Each pixel in the depth map represents a distance from a point on the object corresponding to a pixel to the mobile phone 300.

The indicator 392 may be an indicator light, and may be configured to indicate a charging status and a power change, or may be configured to indicate a message, a missed call, a notification, and the like.

The button 390 includes a power button, a volume button, and the like. The button 390 may be a mechanical button, or may be a touch button. The motor 391 may generate a vibration prompt. The indicator 392 may be an indicator light, and may be configured to indicate a charging status and a power change, or may be configured to indicate a message, a missed call, a notification, and the like. The SIM card interface 395 is configured to connect to a SIM card. The SIM card may be inserted into the SIM card interface 395 or removed from the SIM card interface 395, to implement contact with or separation from the mobile phone 300.

Figure 4:
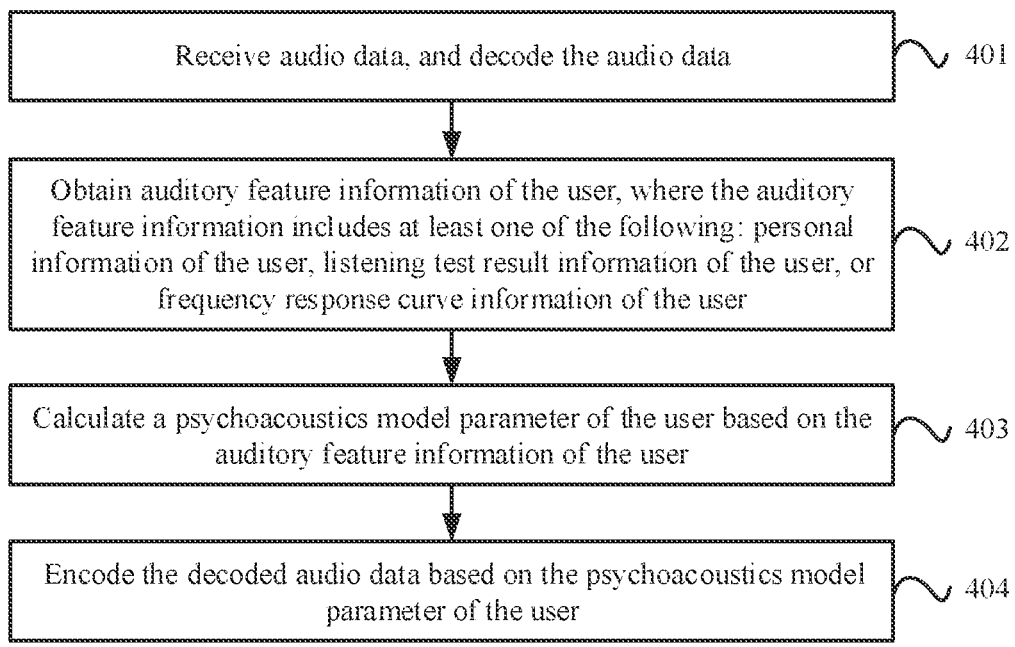
FIG. 4 is a schematic diagram 1 of a psychoacoustics model-based encoding method according to an embodiment of this application.

Refer to the foregoing application scenario shown in FIG. 2. As shown in FIG. 4, the psychoacoustic-based audio encoding method provided in this embodiment of this application includes step 401 to step 404.

Step 401: Receive audio data, and decode the audio data.

In this embodiment of this application, the audio data received by an electronic device from another device (for example, another electronic device) is audio data encoded by using another encoding method, for example, may be audio data encoded by using a preset psychoacoustics model parameter. This is not limited in this embodiment of this application.

Step 402: Obtain auditory feature information of the user, where the auditory feature information includes at least one of the following: personal information of a user, listening test result information of the user, or frequency response curve information of the user.

In this embodiment of this application, the personal information of the user includes basic physiological information of the user, a living habit of the user, and the like. Specifically, the personal information of the user includes at least one of the following: gender information, age information, listening preference information, listening environment information, or working environment information of the user. The listening preference information of the user reflects preferences of the user for different types of music, and the listening preference of the user includes but is not limited to bass, soprano, heavy bass, and the like. The listening environment information reflects a status of an environment in which the user is located when listening to the audio. Optionally, the listening environment of the user is but is not limited to noisy or quiet. For example, in a public occasion such as a subway or a bus, the listening environment of the user is noisy, and in an occasion such as home or an office, the listening environment of the user is quiet. The working environment information of the user reflects a status of an environment in which the user works for a long time. Optionally, the working environment of the user is also but is not limited to noisy or quiet.

It should be understood that an auditory characteristic of a user is related to personal information of the user. For different users, if personal information of the user is different, auditory feelings of the users for a sound are different, that is, auditory characteristics are different. For example, a female is more sensitive to a high-frequency sound than a male. Sensitivity of a user to a sound frequency decreases with age. Sensitivity of users with different listening preferences to sounds at different frequencies is different. Sensitivity of the user to sounds at different frequencies varies with listening environments. For example, when the user is on a noisy subway, the user is insensitive to sound, and the user may not hear a sound with low volume. Sensitivity of the user to sounds at different frequencies varies with working environments. For example, when the user works in a noisy environment for a long time, hearing of the user may be damaged. In this way, the user is insensitive to sound, and the user may not hear a sound with low volume.

In an implementation, the electronic device obtains the personal information of the user by using the following step 4021.

Step 4021: Obtain personal information input by the user in a user information input interface of the electronic device.

Figure 5A:
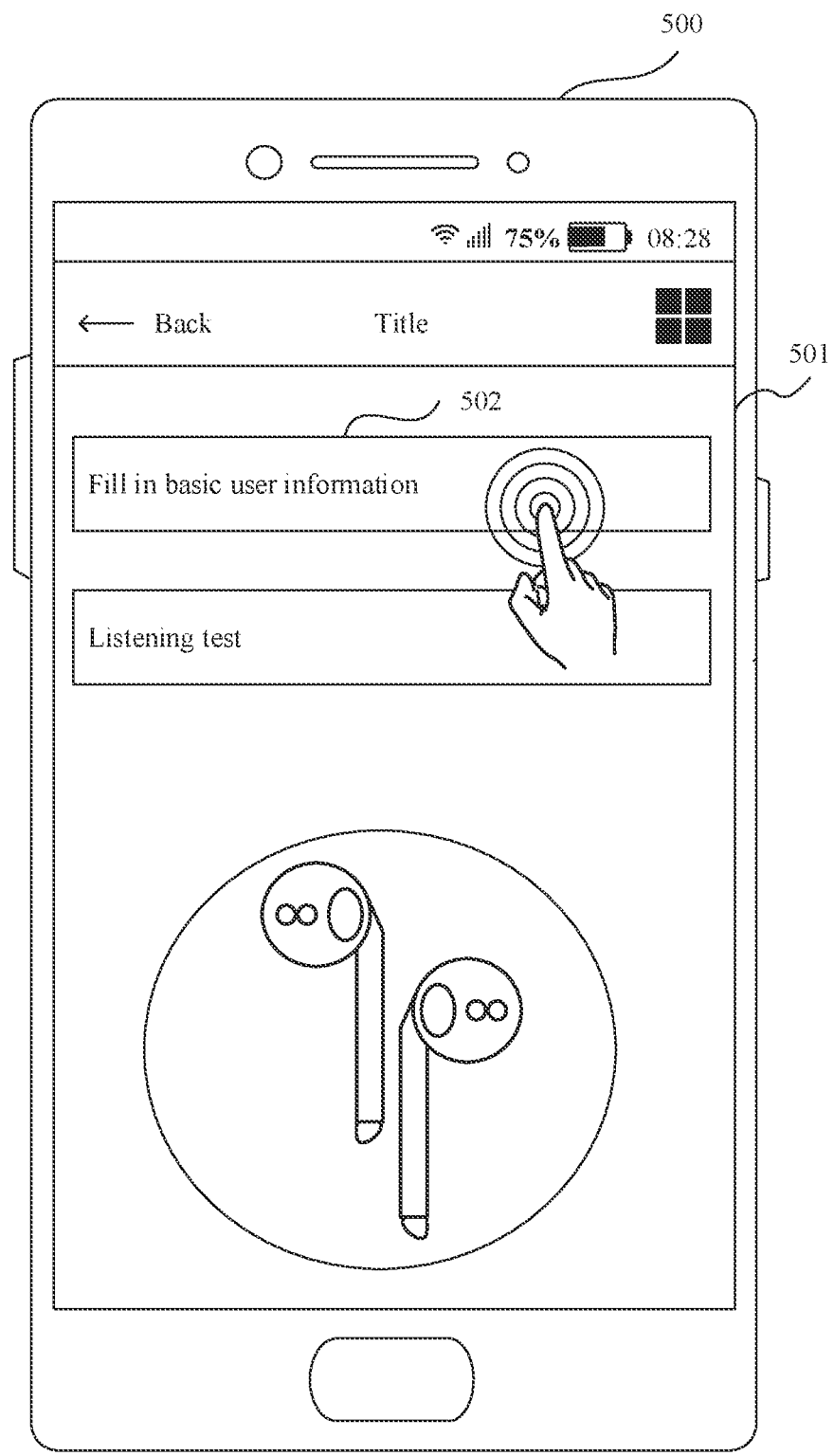
FIG. 5(a) and FIG. 5(b) are a schematic diagram 1 of an example of a display interface of an electronic device according to an embodiment of this application.
Figure 5B:
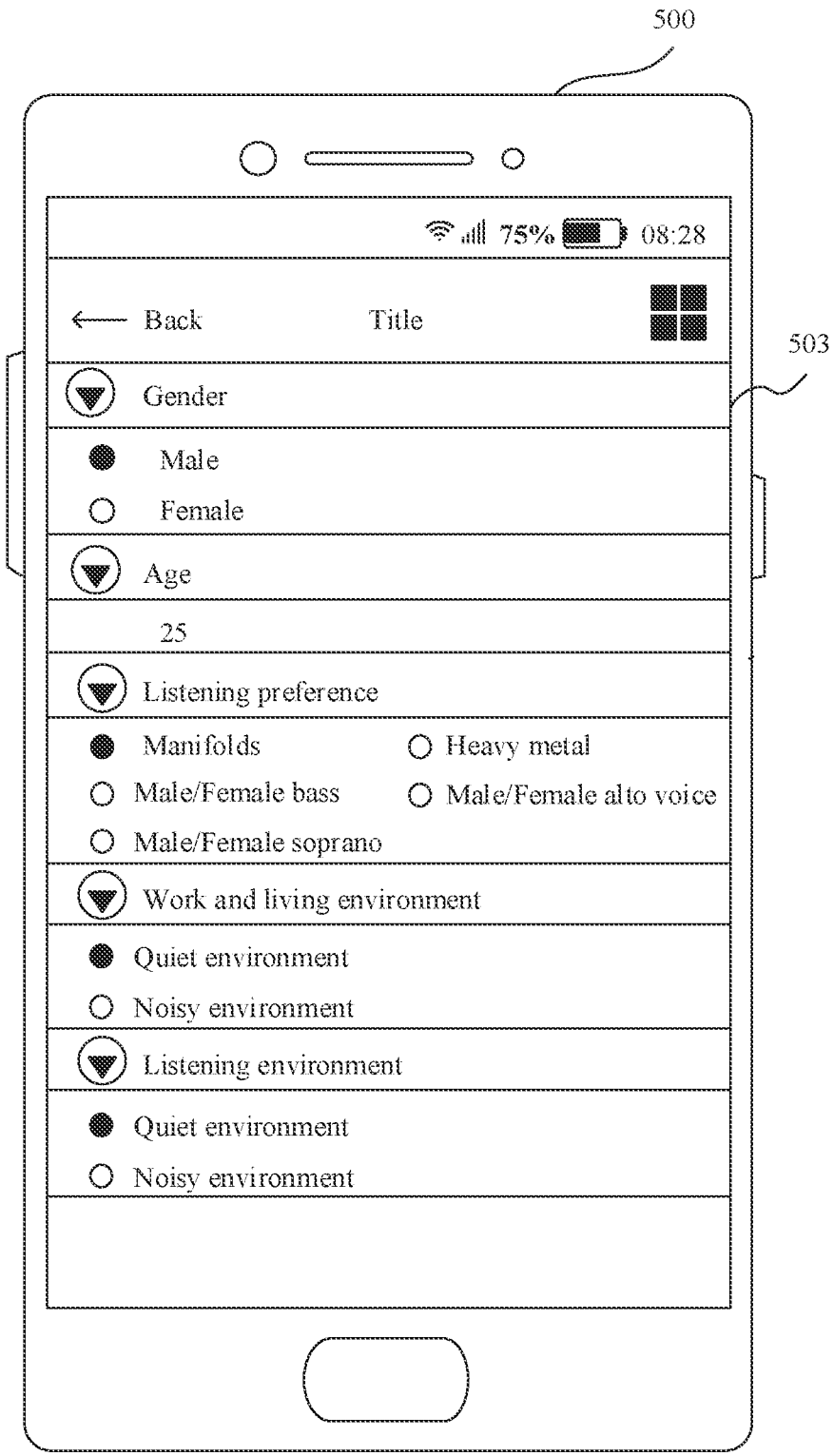

Optionally, the user may input the personal information of the user on the electronic device. For example, the electronic device is a mobile phone. As shown in FIG. 5(*a*) and FIG. 5(*b*), the user inputs the personal information of the user in a related option (for example, a user auditory feature information setting option) of a setting menu of a mobile phone 500. The mobile phone 500 displays an interface 501 shown in FIG. 5(*a*). After the user selects the "fill in basic user information" option 502, the mobile phone 500 displays an interface 503 shown in FIG. 5(*b*). The interface 503 is a user information input interface. The user may input the personal information of the user in the interface 503, for example, gender information, age information, listening preference information, working/living environment information, and listening environment information. Specifically, in the interface 503, the user may select or input the personal information based on an actual situation.

In this embodiment of this application, the listening test result information includes quiet threshold test result information of the user and masking test result information of the user. The quiet threshold test result information includes human ear quiet thresholds corresponding to a plurality of frequency values. The masking test result information includes masking values corresponding to a plurality of frequency values in a masking frequency band.

In an implementation, a listening test is performed on the user by using test audio to obtain listening test result information. For example, the user may complete an audio test (or referred to as the listening test) on an electronic device, and the audio test includes a quiet threshold test and a masking test. The electronic device obtains the listening test result information of the user by using the following step 4022*a* to step 4022*b*.

Step 4022*a*: Obtain a plurality of frequency values input by the user in a first audio test interface of the electronic device and human ear quiet thresholds of the user corresponding to the plurality of frequency values, to obtain quiet threshold test result information.

The human ear quiet threshold of the user is a boundary energy value of test audio. It should be understood that each of the plurality of frequency values corresponds to one human ear quiet threshold. When energy of the test audio is greater than or equal to a boundary energy value of the test audio, the user can perceive the test audio. When the energy of the test audio is less than the boundary energy value of the test audio, the user cannot perceive the test audio.

Figure 6A:
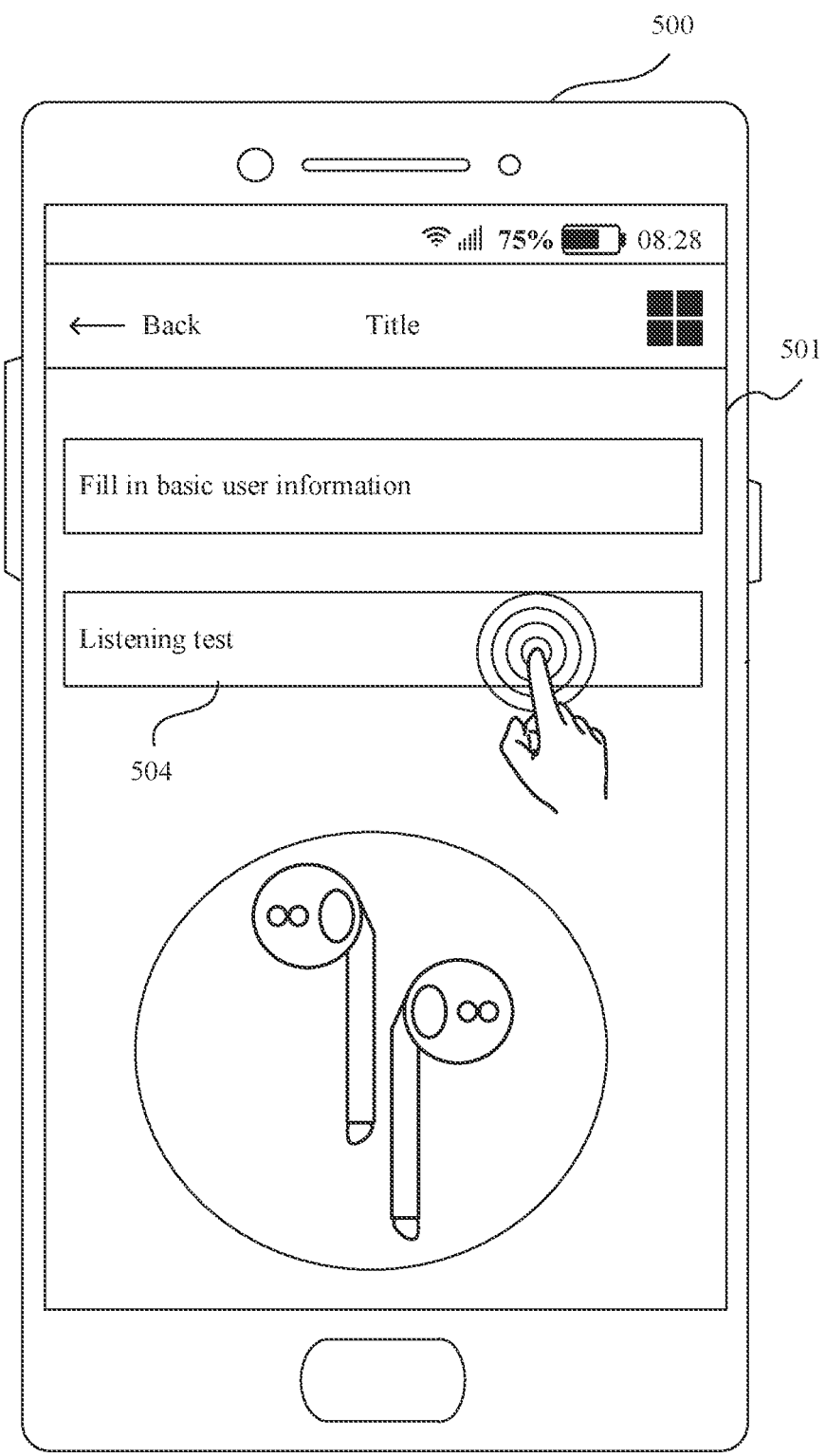
FIG. 6(a) to FIG. 6(c) are a schematic diagram 2 of an example of a display interface of an electronic device according to an embodiment of this application.
Figure 6B:
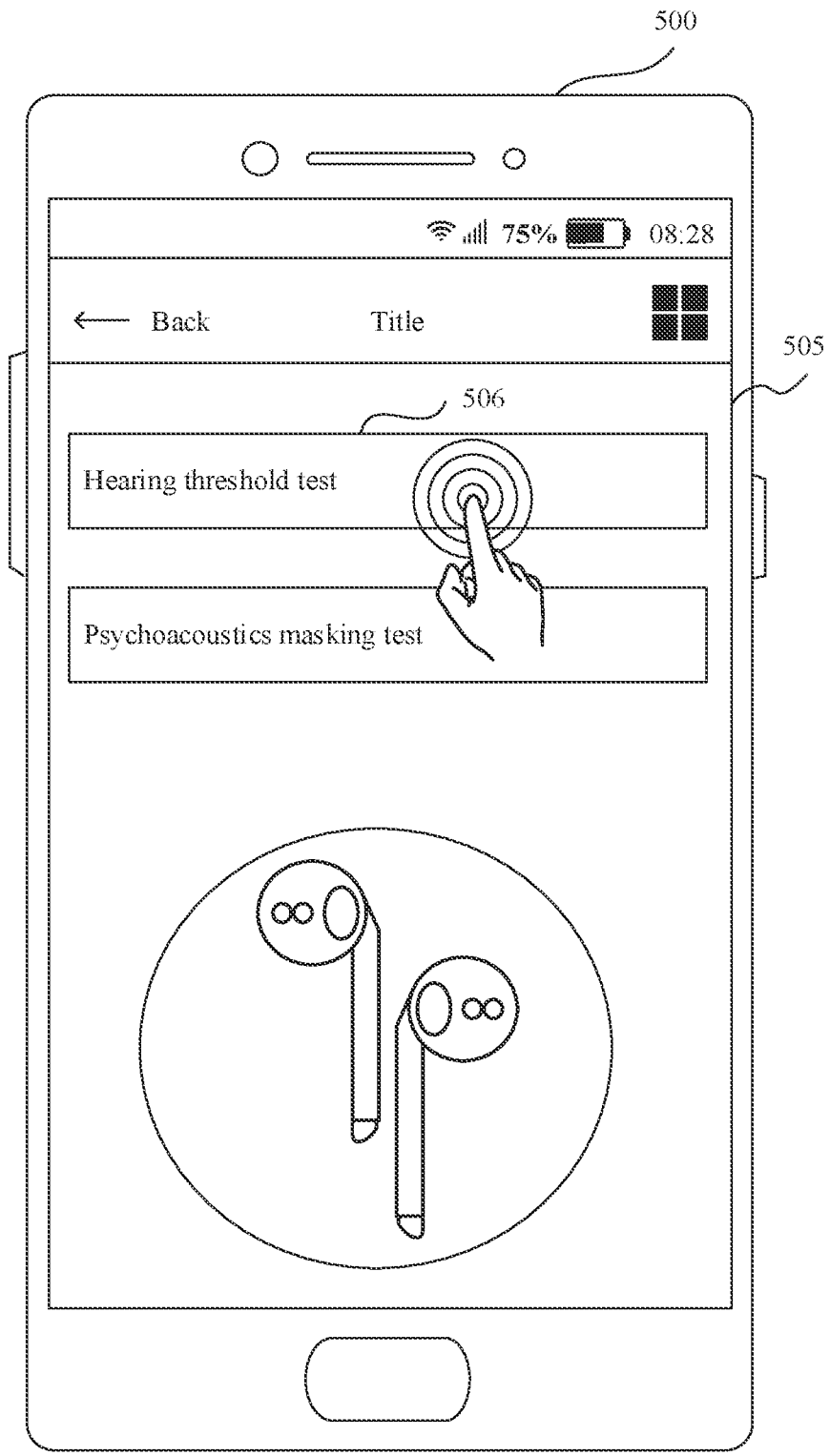

The mobile phone 500 is still used as an example. FIG. 6(*a*) to FIG. 6(*c*) are a schematic diagram of a quiet threshold test process. As shown in FIG. 6(*a*), in the display interface 501 of the mobile phone 500, after the user selects a "listening test" option 504 in the interface 501, the mobile phone 500 displays an interface 505 shown in FIG. 6(*b*). Further, the user selects a "hearing threshold test" option 506 in the interface 505, and the mobile phone 500 displays an interface 507 shown in FIG. 6(*c*). The interface 507 includes a frequency adjustment module 508 and a volume adjustment module 509. The interface 507 is the first audio test interface.

The frequency adjustment module 508 is a frequency scale including 24 Bark scales. It should be understood that the Bark scale is a frequency measurement manner, and is a measurement manner of converting a physical frequency into a psychoacoustics frequency. The frequency scale includes a frequency adjustment button 508a, and frequencies in the frequency scale increase sequentially from left to right. The user slides the frequency adjustment button 508a to the left or right to adjust the frequency of the test audio. The volume adjustment module 509 is a volume scale. The volume scale includes a volume adjustment button 509a, and scales corresponding to left to right in the audio scale indicate that frequencies increase sequentially. The user slides the volume adjustment button 509a to the left or right to adjust the volume of the test audio. It should be understood that volume of the audio at a frequency is energy of the audio at the frequency.

Figure 6C:
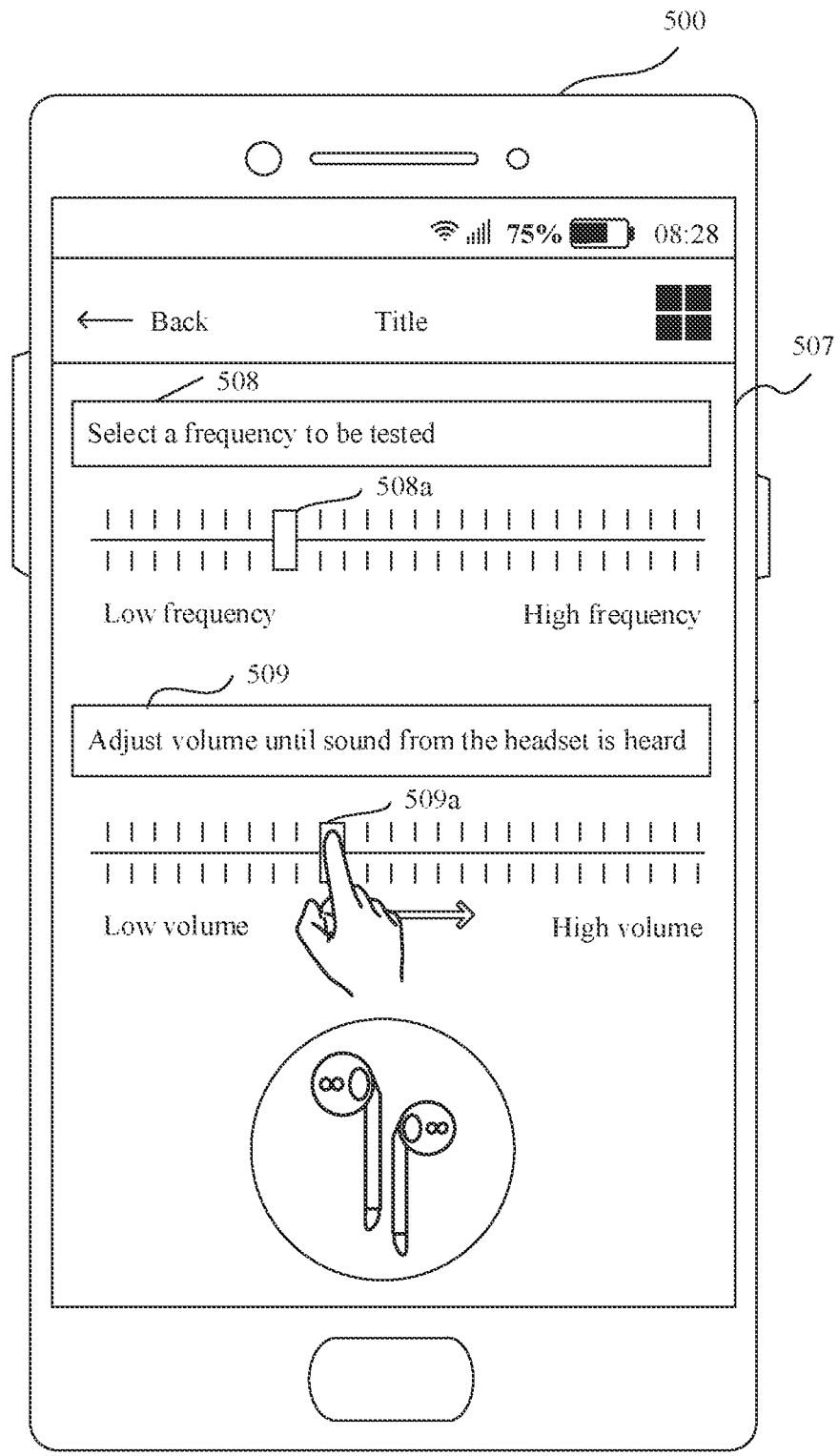

The quiet threshold test process is described in detail with reference to the interface 507 shown in FIG. 6(c). The user separately tests a human ear quiet threshold corresponding to each frequency (that is, 24 Bark scales). Specifically, the user slides the frequency adjustment button 508a to fix the frequency of the test audio at a frequency, and then the user slides the volume adjustment button 509a from low volume to high volume until the user can hear the test audio. In this case, volume corresponding to the volume adjustment button 509a is the boundary energy value of the test audio, that is, a human ear quiet threshold corresponding to the test audio. In this way, all of the foregoing 24 Bark scales are used by using a same test method, to respectively obtain human ear quiet thresholds corresponding to 24 frequencies. In this case, the human ear quiet thresholds corresponding to the plurality of frequency values are obtained.

The following Table 1 is an example of the quiet threshold test result information.

TABLE 1

| Frequency of test audio (Bark scale) | Human ear quiet threshold (dB) |
|---|---|
| 1 | 58 |
| 2 | 46 |
| 3 | 32 |
| 4 | 20 |
| ... | ... |
| 21 | 22 |
| 22 | 12 |
| 23 | 26 |
| 24 | 30e |

Step 4022b: Obtain a plurality of frequency values and masking values corresponding to the plurality of frequency values that are input by the user in a second audio test interface of the electronic device, to obtain masking test result information.

The plurality of frequency values are a plurality of frequency values in a masking frequency band, and one mask frequency corresponds to one masking frequency band. The masking value represents the boundary energy value of the test audio. It should be understood that each of the plurality of frequency values corresponds to one masking value. When energy of the test audio is greater than or equal to a boundary energy value of the test audio, the user can perceive the test audio. When the energy of the test audio is less than the boundary energy value of the test audio, the user cannot perceive the test audio.

Figure 7A:
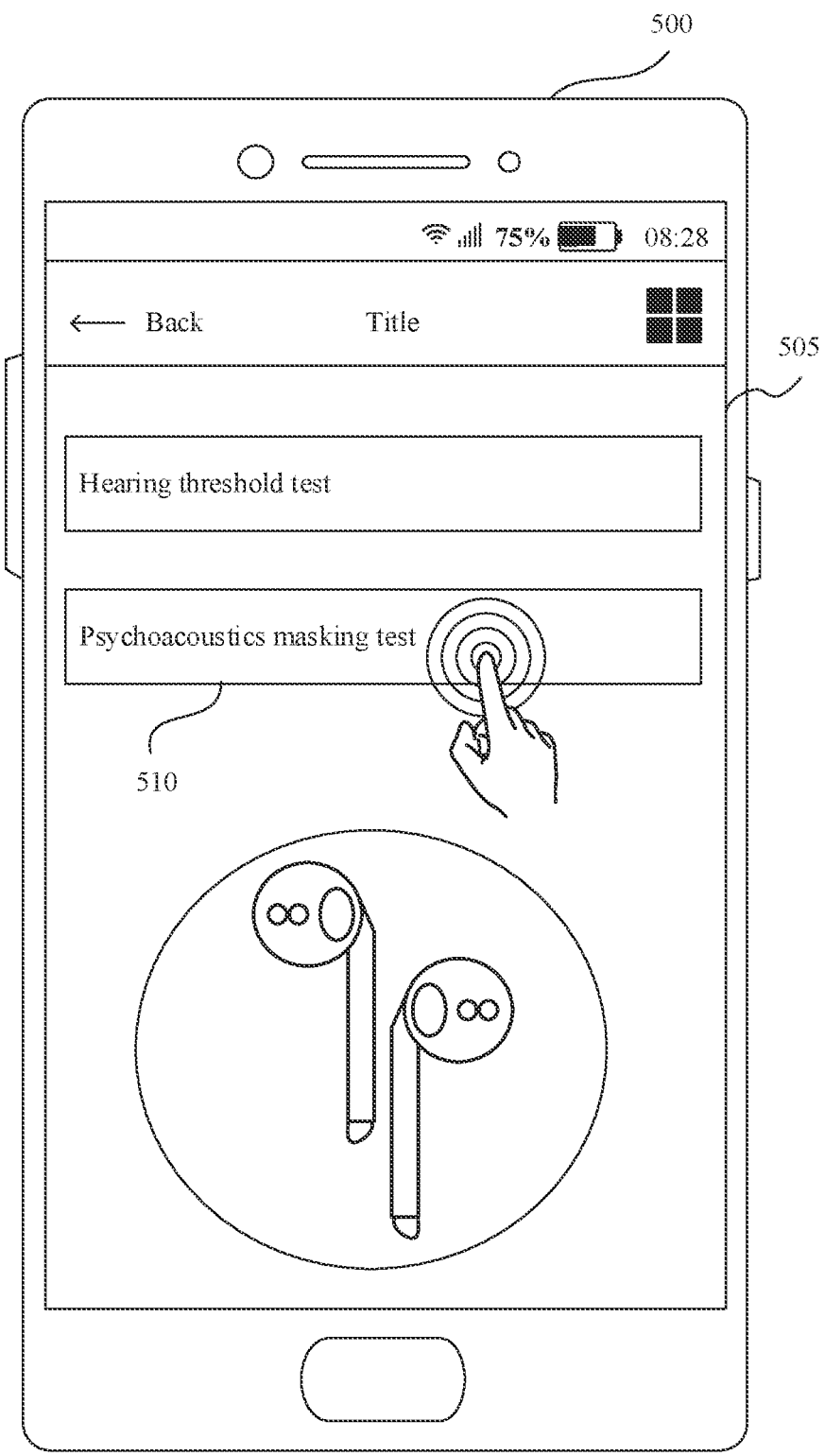
FIG. 7(a) and FIG. 7(b) are a schematic diagram 3 of an example of a display interface of an electronic device according to an embodiment of this application.
Figure 7B:
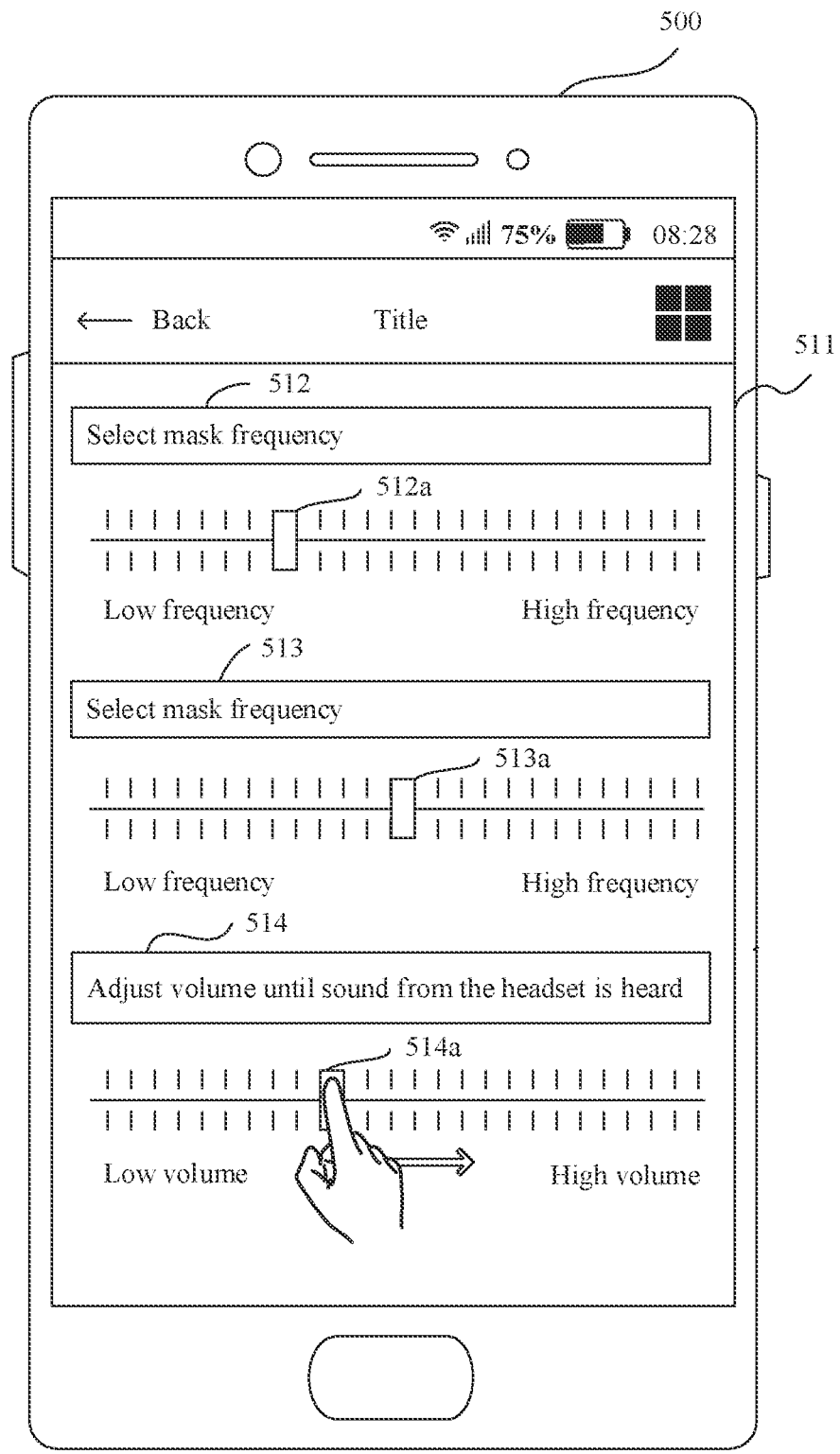

The mobile phone 500 is used as an example. FIG. 7(a) and FIG. 7(b) are a schematic diagram of a masking test process. When the mobile phone 500 displays the interface 505 shown in FIG. 7(a), and after the user selects a "psychoacoustics masking test" option 510, the mobile phone 500 displays an interface 511 shown in FIG. 7(b). The interface 511 includes a mask frequency adjustment module 512, a mask frequency adjustment module 513, and a volume adjustment module 514. The mask frequency adjustment module 512 includes a frequency adjustment button 512a. The mask frequency adjustment module 513 includes a frequency adjustment button 513a. The volume adjustment module 514 includes a volume adjustment button 514a.

The interface 511 shown in FIG. 7(b) is the second audio test interface. In the interface 511, the user separately tests a masking value corresponding to each mask frequency (that is, 24 Bark scales). For example, a masking test process is described by using an example in which masking test result information corresponding to one mask frequency value is tested, and specifically includes the following step 1 to step 2.

Step 1: The user slides a frequency adjustment button 512a to fix a mask frequency of the test audio at a frequency value.

Step 2: The user slides the frequency adjustment button 513a from a low frequency to a high frequency to fix the mask frequency at a frequency value, and then the user slides the volume adjustment button 514a from low volume to high volume until the user can hear a sound of the test audio.

It should be understood that when the mask frequency is a frequency value, the volume is adjusted until the user can hear the sound of the test audio. In this case, the volume corresponding to the volume adjustment button 514a is the masking value corresponding to the mask frequency. After using all 24 mask frequencies, the user obtains masking values corresponding to a plurality of mask frequencies, that is, obtains masking values corresponding to a plurality of frequency values in a masking frequency band.

It should be noted that, in step 2, in a process in which the user uses all the 24 mask frequencies, when the mask frequencies are at some frequency values, the user slides the volume adjustment button 514a from the low volume to the high volume, and the user can always hear the sound of the test audio. In this case, there is no masking value at these mask frequencies. In other words, at these mask frequencies, the mask has no masking effect on the test audio. It should be understood that the mask frequency has a masking value at some frequency values. In other words, the user can obtain the masking value corresponding to the mask frequency by sliding the volume adjustment button 514a from the low volume to the high volume. A plurality of mask frequencies having a masking value form a masking frequency band (a masking frequency band corresponding to the mask). In other words, in the masking frequency band, the mask has masking effect on the test audio.

Refer to the test methods in step 1 and step 2. The user uses all the foregoing 24 Bark scales for the mask frequencies, to respectively obtain masking values corresponding to the plurality of frequency values in the masking frequency band corresponding to the 24 mask frequencies.

The following Table 2 is an example of the masking test result information.

TABLE 2

| Mask frequency Masking value Mask frequency | 1 | 2 | ... | 24 |
|---|---|---|---|---|
| 1 | * | * | ... | * |
| 2 | * | * | ... | * |

TABLE 2-continued

| Mask frequency Masking value Mask frequency | 1 | 2 | ... | 24 |
|---|---|---|---|---|
| 3 | * | * | ... | * |
| 4 | * | * | ... | * |
| 5 | * | * | ... | * |
| 6 | * | * | ... | * |
| 7 | * | * | ... | * |
| 8 | 0.2 | * | ... | * |
| 9 | 0.8 | 0.3 | ... | * |
| 10 | 1 | 0.5 | ... | * |
| 11 | 0.6 | 0.7 | ... | * |
| 12 | 0.2 | 0.6 | ... | * |
| 13 | * | 0.5 | ... | * |
| 14 | * | 0.3 | ... | * |
| 15 | * | * | ... | * |
| 16 | * | * | ... | 1.2 |
| 17 | * | * | ... | 2.5 |
| 18 | * | * | ... | 3.8 |
| 19 | * | * | ... | 2.2 |
| 20 | * | * | ... | 1 |
| 21 | * | * | ... | * |
| 22 | * | * | ... | * |
| 23 | * | * | ... | * |
| 24 | * | * | ... | * |

It should be noted that the data in Table 2 is merely an example, and "*" in Table 2 indicates that there is no masking value.

In an implementation, the electronic device obtains the frequency response curve information of the user by using the following step 4023.

Step 4023: Receive the frequency response curve information of the user.

In this embodiment of this application, the frequency response curve information of the user is received by the electronic device from an audio playing device (for example, a headset). The frequency response curve information of the user is related to hardware characteristic of a sound-making device (for example, a speaker) of the audio playing device and an ear canal characteristic of the user. For example, in an active noise reduction headset, a feedback microphone (feedback mic) is disposed in an accessory of a speaker. When the user wears the headset to listen to a sound, the speaker may capture audio data played by the speaker in a process of playing test audio. In this embodiment of this application, audio data played by the speaker is referred to as first audio data, and audio data captured by the feedback microphone is referred to as second audio data. In this case, the frequency response curve the user reflects a curve of a ratio of an amplitude of a frequency domain signal obtained by performing Fourier transform on the second audio data to an amplitude of a frequency domain signal obtained by performing Fourier transform on the first audio data at each frequency.

Step 403: Calculate a psychoacoustics model parameter of the user based on the auditory feature information of the user.

In this embodiment of this application, the psychoacoustics model parameter of the user includes at least one of the following: an intra-band masking parameter, a slope of a low-frequency inter-band masking line, a slope of a high-frequency inter-band masking line, or a human ear quiet threshold curve.

It should be understood that, generally, when the audio data is encoded, the audio data is divided into one or more subbands in ascending order of frequencies. The one or more subbands are separately encoded, to complete encoding of the audio data. In this embodiment of this application, the psychoacoustics model parameter of the user includes a psychoacoustics model parameter respectively corresponding to at least one subband. The psychoacoustics model parameter corresponding to the subband includes at least one of the following: an intra-band masking parameter of the subband, a slope of a low-frequency inter-band masking line of the subband, a slope of a high-frequency inter-band masking line of the subband, or a human ear quiet threshold curve of the subband. The psychoacoustic-based audio encoding is encoding the one or more subbands based on psychoacoustics model parameters respectively corresponding to the one or more subbands.

For explanations of the four parameters in the psychoacoustics model parameters, refer to FIG. 1, and refer to the foregoing detailed descriptions of the concepts of the psychoacoustics model parameters.

Optionally, the auditory feature information of the user includes one or more items of the personal information of the user, the listening test result information of the user, or the frequency response curve information of the user. The electronic device may determine the psychoacoustics model parameter of the user based on the personal information of the user, or may determine the psychoacoustics model parameter of the user based on the listening test result information of the user, or determine the psychoacoustics model parameter of the user based on the frequency response curve information of the user. Alternatively, the electronic device may determine the psychoacoustics model parameter of the user based on any two or three of the personal information of the user, the listening test result information of the user, or the frequency response curve information of the user. This is not limited in this embodiment of this application.

Figure 8:
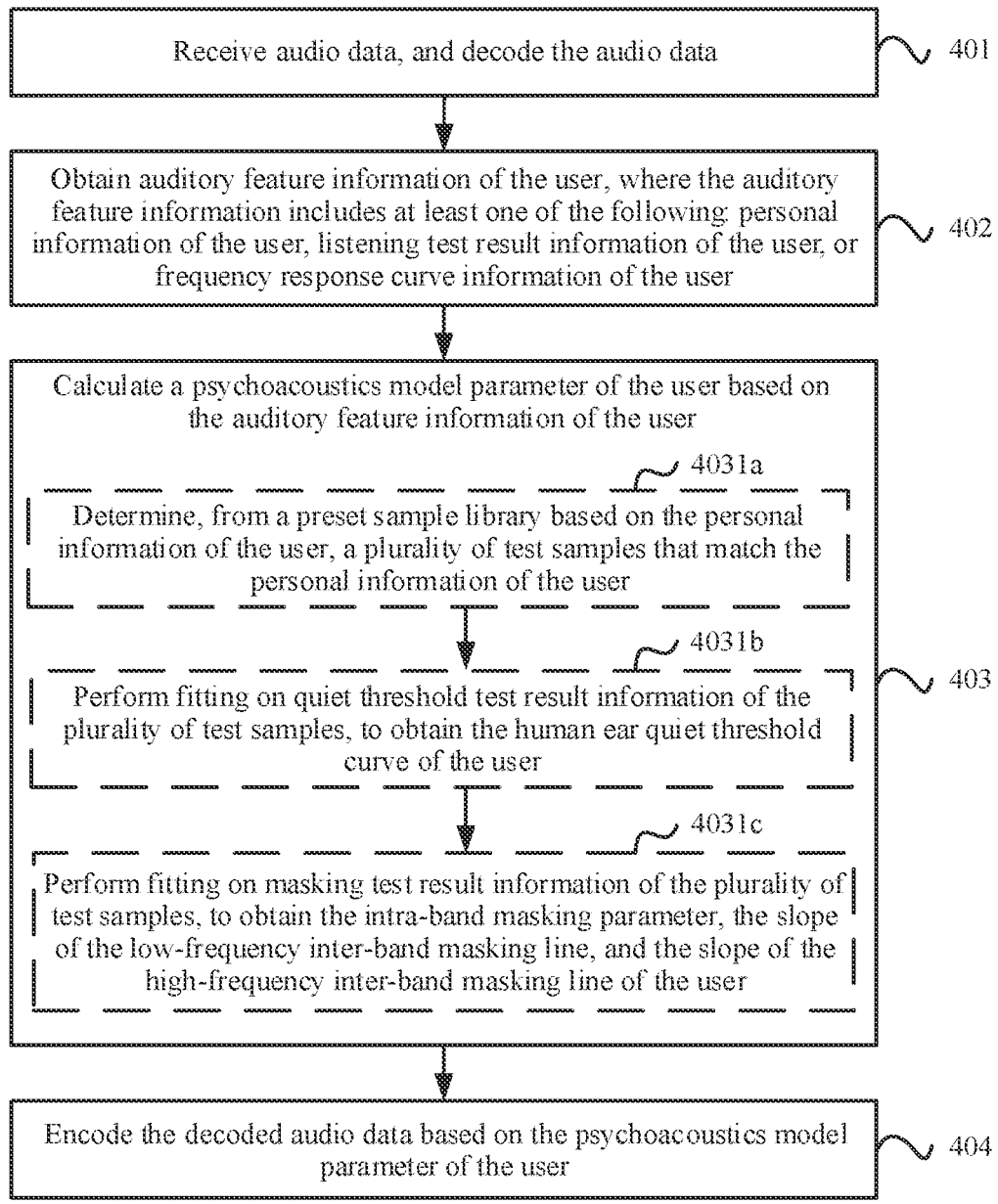
FIG. 8 is a schematic diagram 2 of a psychoacoustics model-based encoding method according to an embodiment of this application.

Optionally, refer to FIG. 4, as shown in FIG. 8. When the auditory feature information of the user obtained by the electronic device is the personal information of the user, the foregoing step 403 specifically includes step 4031a to step 4031c.

Step 4031a: Determine, from a preset sample library based on the personal information of the user, a plurality of test samples that match the personal information of the user.

In this embodiment of this application, the electronic device pre-stores personal information of a large quantity of test samples (that is, a plurality of users, where the plurality of users form a sample library) and listening test result information of each test sample. The listening test result information is obtained by performing listening test on the test samples in the sample library according to the listening test process described in step 4022a to step 4022b.

Optionally, a method for determining, by the electronic device from the preset sample library based on the personal information of the user, the plurality of test samples that match the personal information of the user includes: The electronic device matches the personal information of the user with the personal information in the sample library. A specific matching process includes:

a: Quantize the personal information of the user to form a feature vector of the user.

In this embodiment of this application, the electronic device quantizes the gender information, the age information, the listening preference information, the listening environment information, or the working environment information of the user, and quantizes the gender information, the age information, the listening preference information, the listening environment information, or the working environment information to an interval [0, 1] (that is, normalization), to form the feature vector of the user. It should be understood that the personal information of the test sample stored on the electronic device is also quantized personal information.

b: Calculate an inner product of the feature vector of the user and the feature vector of the test sample in the sample library.

c: Select a test sample corresponding to a plurality of feature vectors whose inner product is greater than or equal to a first preset threshold as the test sample that matches the personal information of the user.

It should be understood that a larger inner product of the feature vector of the user and the feature vector of the test sample in the sample library indicates that the two feature vectors are more similar. In other words, personal information of two users is more similar.

In an implementation, a square difference between the feature vector of the user and the feature vector of the test sample in the sample library may be further calculated. A smaller square difference indicates that the two feature vectors are more similar. Therefore, a test sample corresponding to a plurality of feature vectors whose square differences are less than or equal to a second preset threshold is selected as the test sample that match the personal information of the user.

Optionally, the plurality of test samples that match the personal information of the user may be determined from the sample library by using another matching method. This is not limited in this embodiment of this application.

Further, the listening test result information of the plurality of test samples is fitted to obtain the psychoacoustics model parameter of the user. Refer to step 4031b to step 4031c.

Step 4031b: Perform fitting on quiet threshold test result information of the plurality of test samples, to obtain the human ear quiet threshold curve of the user.

Optionally, a general function expression of the human ear quiet threshold curve is:

$$L(f) = a \times \left(\frac{f}{1000}\right)^{-0.8} + b \times \exp\left[-0.6\left(\frac{f}{1000} - 3.3\right)^2\right] + c \times \left(\frac{f}{1000}\right)^4$$

L(f) represents the human ear quiet threshold curve. f represents a mask frequency. a, b, and c are parameters of the human ear quiet threshold curve. Value ranges of the three parameters are $3 \leq a \leq 4$, $-0.7 \leq b \leq -0.6$, and $5 \times 10^{-4} \leq b \leq 2 \times 10^{-3}$.

In this embodiment of this application, performing fitting on quiet threshold test result information of the plurality of test samples specifically means determining a function expression of a human ear quiet threshold curve based on the quiet threshold test result information of the plurality of test samples, that is, solving parameters a, b, and c in the function expression.

For example, a quantity of the plurality of test samples is m (m is a positive integer greater than or equal to 2), and quiet threshold test result information of the m test samples is shown in Table 3.

TABLE 3

| | Test Sample | | | | | | |
|---|---|---|---|---|---|---|---|
| | 1 | | 2 | | ... | m | |
| f | $f_{11}$ | ... | $f_{1n}$ | $f_{21}$ | ... $f_{2n}$ | ... $f_{m1}$ | ... $f_{mn}$ |
| L(f) | $p_{11}$ | ... | $p_{1n}$ | $p_{21}$ | $p_{2n}$ | ... $p_{m1}$ | ... $p_{mn}$ |

In Table 3, n is 24 (that is, 24 Bark scales).

Optionally, based on the quiet threshold test result information of the m test samples show % n in Table 3, data fitting is performed by using a least square method, so that $$\sum_{i=1}^{m}\sum_{j=1}^{n}|L(f_{ij}) - p_{ij}|^2$$

is minimum, to obtain parameters a, b, and c in a function expression of L(f), and further obtain a human ear quiet threshold curve L(f).

In this embodiment of this application, the personal information of the user has important impact on the human ear quiet threshold curve. For example, a female is more sensitive to a high-frequency sound than a male. Therefore, in a high-frequency part of the human ear quiet threshold curve, a human ear quiet threshold of a female is less than a human ear quiet threshold of a male. For another example, for a user who prefers bass or heavy bass, a human ear quiet threshold corresponding to a low-frequency part of a human ear quiet threshold curve of the user is less than a human ear quiet threshold of another user (for example, a user who prefers soprano). For another example, sensitivity of a user to a high frequency decreases as age increases. Therefore, for an older user, a human ear quiet threshold corresponding to a high-frequency part of a human ear quiet threshold curve of the user is greater than the human ear quiet threshold of another user (another user who is younger than that of the user). For another example, if a user works or lives in a noisy environment for a long time, hearing of the user is impaired. Therefore, a human ear quiet threshold of the user is increased in a full frequency band. For another example, in a noisy listening environment such as a subway or a bus, a human ear quiet threshold of a user increases in the full frequency band.

Step 4031c: Perform fitting on masking test result information of the plurality of test samples, to obtain the intra-band masking parameter, the slope of the low-frequency inter-band masking line, and the slope of the high-frequency inter-band masking line of the user.

Optionally, the electronic device obtains, based on the masking test result information of the plurality of test samples and by using a linear fitting method, a function of a low-frequency inter-band masking line and a function of a high-frequency inter-band masking line, to determine the slope of the low-frequency inter-band masking line and the slope of the high-frequency inter-band masking line. For example, a function of the low-frequency inter-band masking line is set to $y_1 = k_1 x_1 + b_1$. $x_1$ represents a frequency. $y_1$ represents a masking value corresponding to the frequency $x_1$. $k_1$ is a slope of the low-frequency inter-band masking line. $k_1 > 0$. $b_1$ is a parameter of the low-frequency inter-band masking line. $b_1$ is a real number. A function of the high-frequency inter-band masking line is set to $y_2 = k_2 x_2 + b_2$. $x_2$ represents a frequency. $y_2$ represents a masking value corresponding to the frequency $x_2$. $k_2$ is a slope of the high-frequency inter-band masking line. $k_2 < 0$. $b_2$ is a real number. It should be noted that, a rule of linear fitting is: enabling a sum of squares of distances from each data point to a corresponding line in the masking test result information of the test sample to be minimum, to obtain $k_1$, $b_1$, $k_2$, and $b_2$.

After $k_1$, $b_1$, $k_2$, and $b_2$ are obtained through the foregoing solution, an intersection point of the low-frequency inter-band masking line (that is, $y=k_1x+b_1$) and the high-frequency inter-band masking line (that is, $y_2=k_2x_2+b_2$) is further obtained, to determine the intra-band masking parameter ($d_r$). The intra-band masking parameter is a difference between energy of the mask and a masking value (that is, energy) corresponding to the intersection point.

The energy of the mask is calculated according to the following formula:

$$E=[X(f)]^2+[X(f+1)]^2+\ldots+[X(f+s)]^2$$

E represents the energy of the mask, X(f) represents a frequency domain value obtained after Fourier transform is performed on the audio data at a frequency f of the mask, and s represents a frequency domain width of a Butter spectrum in which the mask is located.

In this embodiment of this application, the personal information of the user also has important impact on the slope of the low-frequency inter-band masking line, the slope of the high-frequency inter-band masking line, and the intra-band masking parameter. For example, a female is more sensitive to high-frequency sounds than a male. Therefore, at high frequencies, a slope of a low-frequency inter-band masking line for a female is greater than a slope of a low-frequency inter-band masking line for a male. A slope of a high-frequency inter-band masking line of the female is greater than a slope of a high-frequency inter-band masking line of the male. An intra-band masking parameter of the female is greater than an intra-band masking parameter of the male.

For another example, sensitivity of a user to a high frequency decreases with age. Therefore, for an older user, at the high frequency, a slope of a low-frequency inter-band masking line of the user is less than a slope of a low-frequency inter-band masking line of another user (another user who is younger than the user). A slope of a high-frequency inter-band masking line of the user is less than a slope of a high-frequency inter-band masking line of the another user. An intra-band masking parameter of the user is less than an intra-band masking parameter of the another user.

For another example, for a user who prefers bass or heavy bass, at a low frequency, a slope of a low-frequency inter-band masking line of the user is greater than a slope of a low-frequency inter-band masking line of another user (for example, a user who prefers soprano). A slope of a high-frequency inter-band masking line of the user is greater than a slope of a high-frequency inter-band masking line of another user. An intra-band masking parameter of the user is greater than an intra-band masking parameter of the another user.

For another example, hearing of a user is impaired when the user works or lives in a noisy environment for a long time. Therefore, at each frequency band, a slope of a low-frequency inter-band masking line of the user is less than a slope of a low-frequency inter-band masking line of another user (for example, a user who works or lives in a quiet environment). A slope of a high-frequency inter-band masking line of the user is less than a slope of a high-frequency inter-band masking line of the another user. An intra-band masking parameter of the user is less than an intra-band masking parameter of the another user.

For another example, in a noisy listening environment such as a subway or a bus, at each frequency band, a slope of a low-frequency inter-band masking line of a user decreases, a slope of a high-frequency inter-band masking line of the user decreases, and an intra-band masking parameter of the user decreases.

In this embodiment of this application, the plurality of test samples (that is, the plurality of test samples matching the user) that match the personal information of the user are determined from the preset sample library based on the personal information of the user. The psychoacoustics model parameter of the user is obtained through fitting based on the listening test result information of the plurality of test samples. In this way, a more appropriate psychoacoustics model parameter can be selected based on a personalized auditory characteristic of the user. Compared with a conventional technology, the psychoacoustics model parameter is more suitable for the auditory characteristic of the user. Further, the decoded audio data is encoded based on the psychoacoustics model parameter of the user, and the encoded audio data is sent to an audio receiver (for example, a headset) for decoding and then playing. In this way, the user can hear audio suitable for the auditory characteristic of the user, thereby significantly improving audio perceiving experience of the user.

Figure 9:
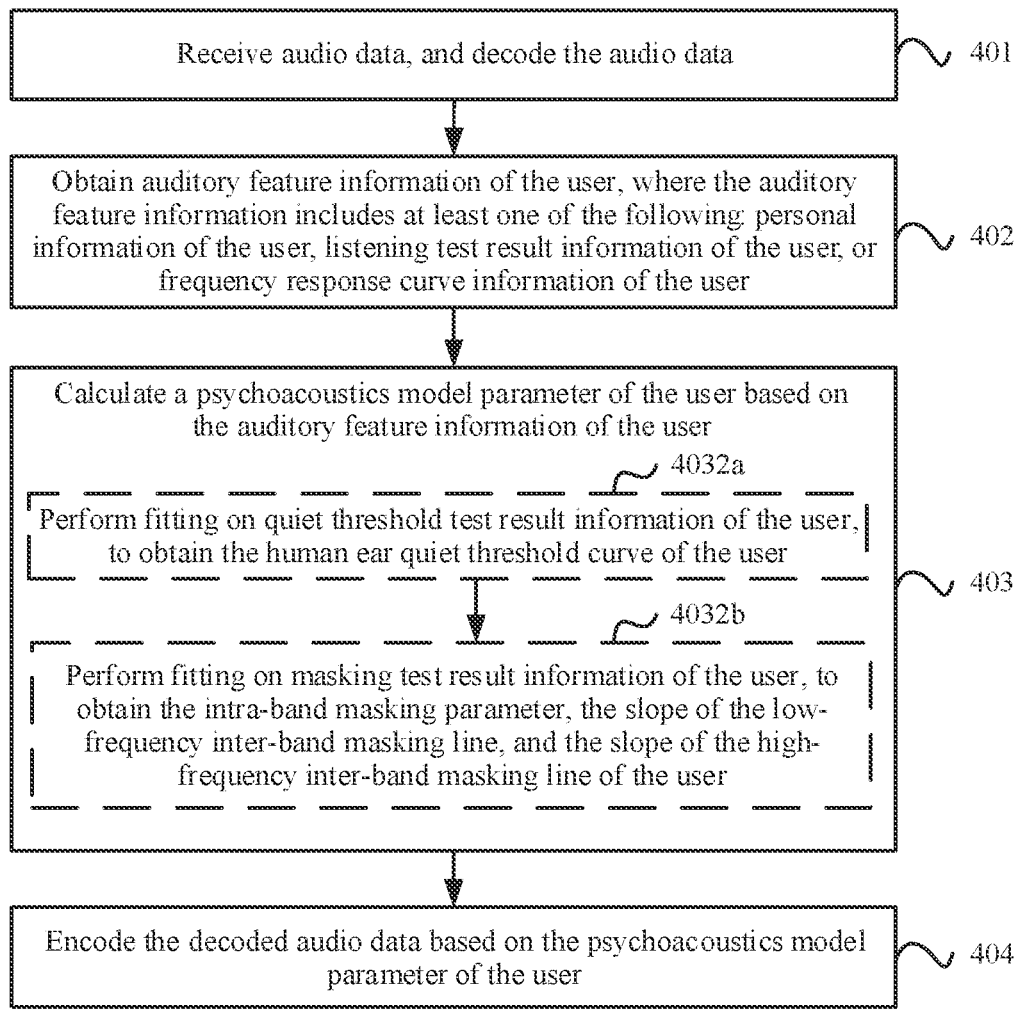
FIG. 9 is a schematic diagram 3 of a psychoacoustics model-based encoding method according to an embodiment of this application.

Optionally, refer to FIG. 4, as shown in FIG. 9. When the auditory feature information of the user obtained by the electronic device is the listening test result information of the user, the foregoing step 403 specifically includes step 4032*a* to step 4032*b*.

Step 4032*a*: Perform fitting on quiet threshold test result information of the user, to obtain the human ear quiet threshold curve of the user.

Step 4032*b*: Perform fitting on masking test result information of the user, to obtain the intra-band masking parameter, the slope of the low-frequency inter-band masking line, and the slope of the high-frequency inter-band masking line of the user.

In this embodiment of this application, a method for fitting the quiet threshold test result information of the user, to obtain the human ear quiet threshold curve is similar to the method for fitting the quiet threshold test result information of the plurality of test samples, to obtain the human ear quiet threshold curve of the user in step 4031*b*. In addition, a method for fitting the masking test result information of the user, to obtain the intra-band masking parameter of the user, the slope of the low-frequency inter-band masking line, and the slope of the high-frequency inter-band masking line is similar to the method for fitting the masking test result information of the plurality of test samples, to obtain the intra-band masking parameter of the user, the slope of the low-frequency inter-band masking line, and the slope of the high-frequency inter-band masking line in step 4031*c*. Therefore, for descriptions of step 4032*a* to step 4032*b*, refer to the foregoing detailed descriptions of step 4031*b* to step 4031*c*. Details are not described herein again.

In this embodiment of this application, the psychoacoustics model parameter of the user is obtained through fitting based on listening test result information of the user. The psychoacoustics model parameter is related to a personalized auditory characteristic of the user and a hardware characteristic of the sound-making device. Compared with a conventional technology, the psychoacoustics model parameter is more suitable for the auditory characteristic of the user. Further, the decoded audio data is encoded based on the psychoacoustics model parameter of the user, and the encoded audio data is sent to an audio receiver (for example, a headset) for decoding and then playing. In this way, the user can hear audio suitable for the auditory characteristic of the user, thereby significantly improving audio perceiving experience of the user.

Figure 10:
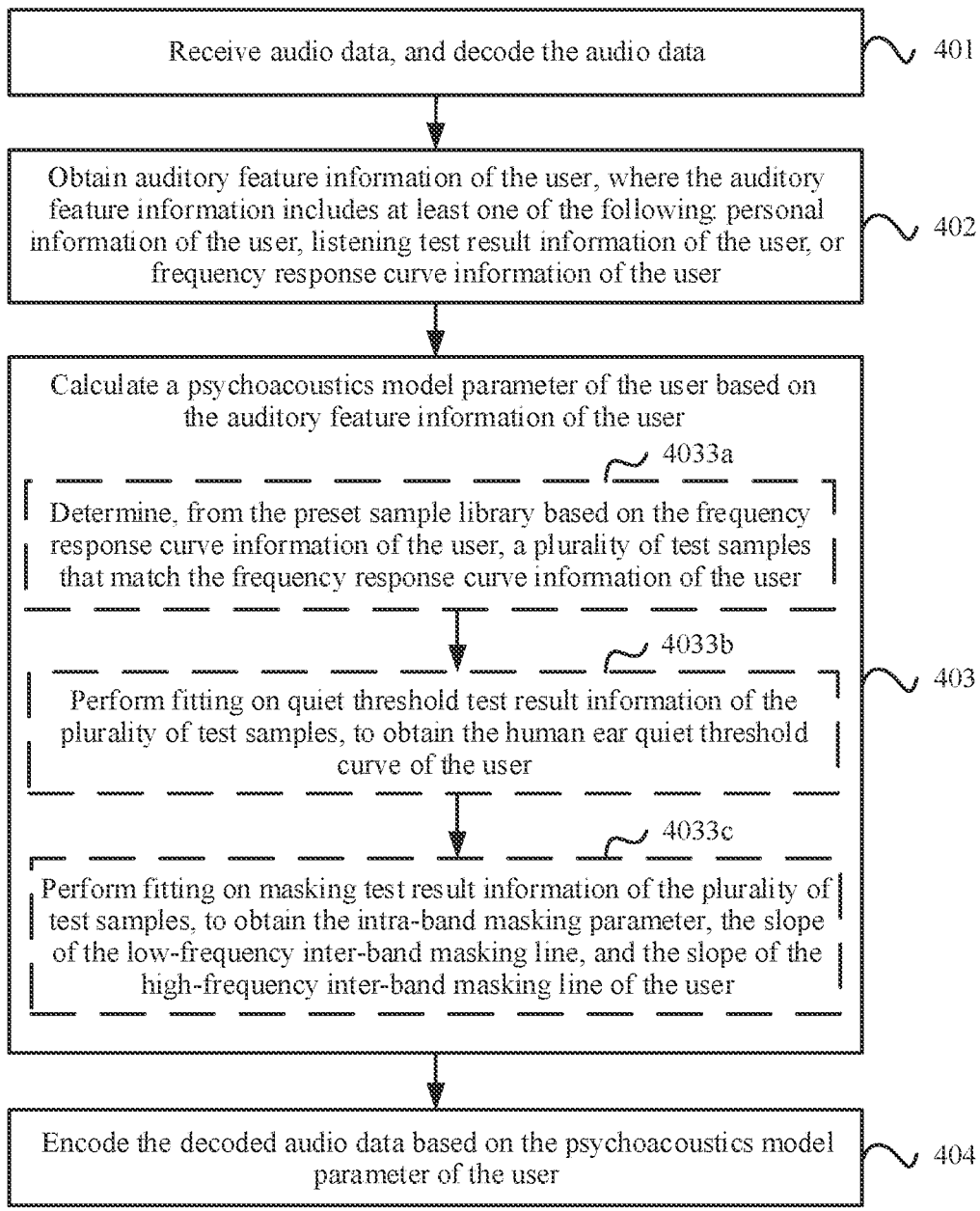
FIG. 10 is a schematic diagram 4 of a psychoacoustics model-based encoding method according to an embodiment of this application.

Optionally, refer to FIG. 4, as shown in FIG. 10. When the auditory feature information of the user obtained by the electronic device is the listening test result information of the user, the foregoing step 403 specifically includes step 4033a to step 4033c.

Step 4033a: Determine, from the preset sample library based on the frequency response curve information of the user, a plurality of test samples that match the frequency response curve information of the user.

In this embodiment of this application, the electronic device pre-stores frequency response curve information of a large quantity of test samples (that is, a plurality of users, where the plurality of users form a sample library) and listening test result information of each test sample. The frequency response curve information is determined based on the audio data played by the sound-making device of the audio play device and the audio data captured by the feedback microphone that are described in step 402. The listening test result information is obtained by performing listening test on the test samples in the sample library according to the listening test process described in step 402.

Optionally, a method for determining, by the electronic device from the preset sample library based on the frequency response curve information of the user, the plurality of test samples that match the frequency response curve information of the user includes: The electronic device matches the frequency response curve of the user with the frequency response curve information in the sample library. A specific matching process includes:

a: The electronic device quantizes the frequency response curve information of the user to obtain a frequency response vector of the user.

For example, the electronic device divides the frequency response curve information of the user into 24 segments based on a Bark scale, and uses a value corresponding to a center frequency point of each frequency band in the frequency response curve information as a feature value of the segment, to obtain a 24-dimensional feature vector. The feature vector is quantized to an interval [0, 1] (that is, normalized), and the feature vector is determined as the frequency response vector of the user. It should be understood that the frequency response curve information of the test sample stored in the electronic device is the frequency response vector of the user.

b: Calculate an inner product of the frequency response vector of the user and a frequency response vector of a test sample in the sample library.

c: Select a test sample corresponding to a plurality of frequency response vectors whose inner product is greater than or equal to a third preset threshold as the test sample that matches the frequency response curve information of the user.

It should be understood that a larger inner product of the frequency response vector of the user and the frequency response vector of the test sample in the sample library indicates that the two frequency response vectors are more similar. In other words, frequency response curve information of two users is more similar.

In an implementation, a square difference between the frequency response vector of the user and the frequency response vector of the test sample in the sample library may be further calculated. Because a smaller square difference indicates that the two frequency response vectors are more similar, a test sample corresponding to a plurality of frequency response vectors whose square differences are less than or equal to a fourth preset threshold is selected as the test sample that match the frequency response curve information of the user.

Further, the listening test result information of the plurality of test samples is fitted to obtain the psychoacoustics model parameter of the user. Refer to step 4033b to step 4033c.

Step 4033b: Perform fitting on quiet threshold test result information of the plurality of test samples, to obtain the human ear quiet threshold curve of the user.

Step 4033c: Perform fitting on masking test result information of the plurality of test samples, to obtain the intra-band masking parameter, the slope of the low-frequency inter-band masking line, and the slope of the high-frequency inter-band masking line of the user.

After the plurality of test samples are obtained through matching by using the frequency response curve information, a process of fitting the listening test result information of the plurality of test samples is similar to step 4031b to step 4031c. For descriptions of step 4033b to step 4033c, refer to the detailed descriptions of step 4031b to step 4031c. Details are not described herein again.

In this embodiment of this application, the plurality of test samples (that is, the plurality of test samples matching the user) that match the frequency response curve information of the user are determined from the sample library based on the frequency response curve information of the user. Further, the psychoacoustics model parameter of the user is obtained through fitting based on the listening test result information of the plurality of test samples. The psychoacoustics model parameter is related to an ear canal structure of the user and a hardware characteristic of a sound-making device. Compared with the conventional technology, the psychoacoustics model parameter is more suitable for an auditory characteristic of the user. Further, the decoded audio data is encoded based on the psychoacoustics model parameter of the user, and the encoded audio data is sent to an audio receiver (for example, a headset) for decoding and then playing. In this way, the user can hear audio suitable for the auditory characteristic of the user, thereby significantly improving audio perceiving experience of the user.

In this embodiment of this application, when the auditory feature information of the user is at least two of the personal information of the user, the listening test result information of the user, or the frequency response curve information of the user, the foregoing step 403 may specifically include step 4034a to step 4034b.

Step 4034a: Determine, based on at least two types of auditory feature information of the personal information of the user, the listening test result information of the user, and the frequency response curve information of the user, psychoacoustics model parameters respectively corresponding to the at least two types of auditory feature information.

In this embodiment of this application, for a method for determining the psychoacoustics model parameters respectively corresponding to the at least two types of auditory feature information, refer to related description in the foregoing embodiment. For example, if the auditory feature information of the user includes the personal information of the user and the listening test result information of the user, the electronic device determines the psychoacoustics model parameter of the user based on the personal information of the user according to the process described in step 4031a to step 4031c, and determines the psychoacoustics model parameter of the user based on the listening test result information of the user according to the process described in the foregoing step 4032a to step 4032b.

Step 4034b: Perform weighted summation on the psychoacoustics model parameters respectively corresponding to the at least two types of auditory feature information, to obtain the psychoacoustics model parameter of the user.

Specifically, weights are set for the psychoacoustics model parameters respectively corresponding to the at least two types of auditory feature information, and result information of the weighted summation is used as the psychoacoustics model parameter of the user. For example, the auditory feature information includes the personal information of the user and the listening test result information of the user. A weight of a psychoacoustics model parameter corresponding to the personal information of the user is set to 0.2, and a weight of the psychoacoustics model parameter corresponding to the listening test result information of the user is set to 0.8. Therefore, a sum of a psychoacoustics model parameter corresponding to 0.2 times the listening test result information of the user and a psychoacoustics model parameter corresponding to 0.8 times the listening test result information of the user is used as the psychoacoustics model parameter of the user.

Alternatively, in an implementation, after the psychoacoustics model parameters respectively corresponding to the at least two types of auditory feature information is determined, priorities may be set for the psychoacoustics model parameters respectively corresponding to the at least two types of auditory feature information. A psychoacoustics model parameter corresponding to one type of auditory feature information with a higher priority is used as the psychoacoustics model parameter of the user. For example, the auditory feature information includes the personal information of the user and listening test result information of the user. Because the psychoacoustics model parameter of the user determined based on the listening test result information of the user is more suitable for the auditory characteristic of the user, the priority of the psychoacoustics model parameter corresponding to the listening test result information of the user is set to be higher than the priority of the psychoacoustics model parameter corresponding to the personal information of the user. Therefore, the psychoacoustics model parameter corresponding to the listening test result information of the user is used as the psychoacoustics model parameter of the user. For another example, the auditory feature information includes the listening test result information of the user and the frequency response curve information of the user. Similarly, a priority of a psychoacoustics model parameter corresponding to the listening test result information of the user is set to be higher than a priority of a psychoacoustics model parameter corresponding to the frequency response curve information of the user. Therefore, the psychoacoustics model parameter corresponding to the listening test result information of the user is used as the psychoacoustics model parameter of the user.

Optionally, another method may be used based on an actual requirement to determine the psychoacoustics model parameter of the user based on the psychoacoustics model parameters respectively corresponding to the at least two types of auditory feature information. This is not limited in this embodiment of this application.

In this embodiment of this application, the psychoacoustics model parameter of the user is determined by performing weighted summation on the psychoacoustics model parameters respectively corresponding to the at least two types of auditory feature information of the user, so that accuracy of the psychoacoustics model parameter of the user can be further improved. The decoded audio data is encoded based on the psychoacoustics model parameter of the user, and the encoded audio data is sent to the audio receiver for decoding and then playing. In this way, the user can hear audio suitable for the auditory characteristic of the user, thereby significantly improving audio perceiving experience of the user.

Step 404: Encode the decoded audio data based on the psychoacoustics model parameter of the user.

In this embodiment of this application, the psychoacoustics model parameter of the user includes psychoacoustics model parameters corresponding to one or more subbands. The electronic device separately encodes the one or more subbands of the decoded audio data based on the psychoacoustics model parameters corresponding to the one or more subbands.

Optionally, after the electronic device encodes the decoded audio data, the electronic device sends the encoded audio data to an audio receiver (for example, a headset or another device), and then the audio receiver decodes and plays the encoded audio data.

Figure 11:
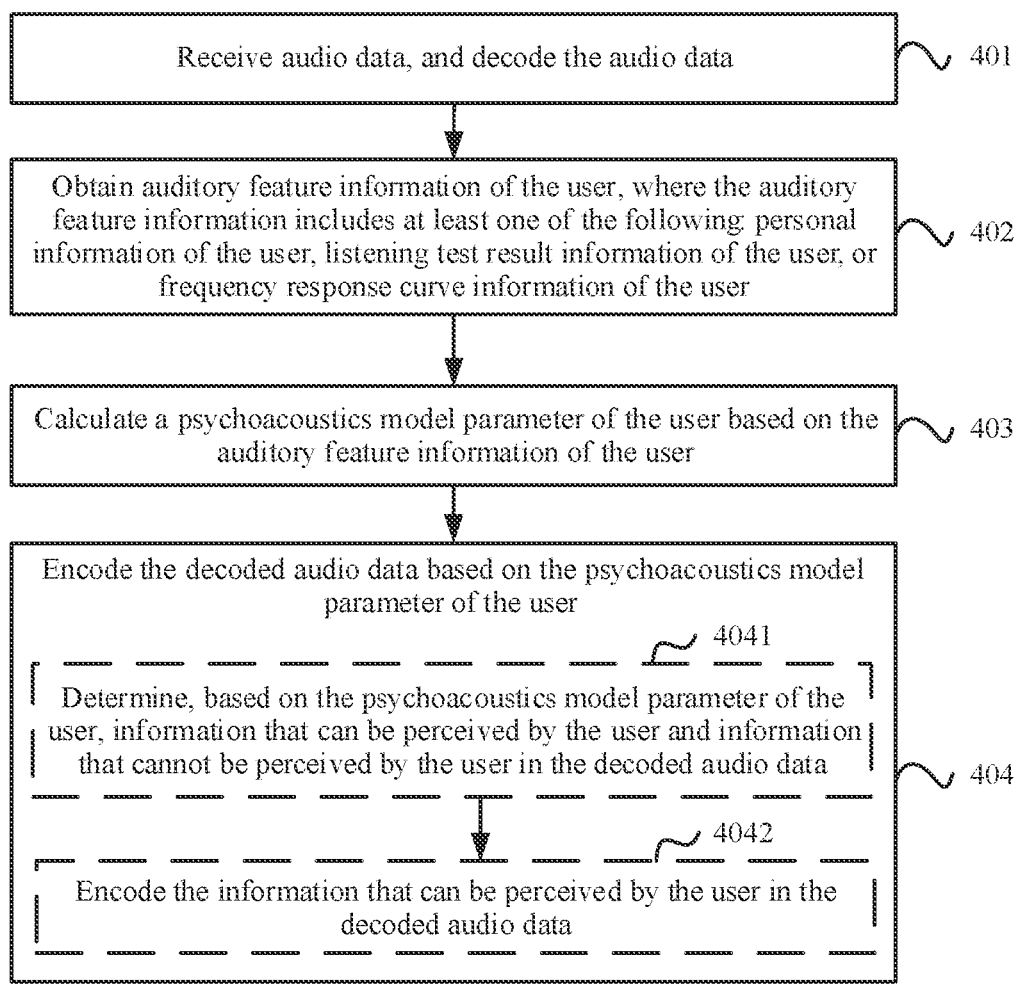
FIG. 11 is a schematic diagram 5 of a psychoacoustics model-based encoding method according to an embodiment of this application.

Refer to FIG. 4, as shown in FIG. 11. Step 404 specifically includes step 4041 to step 4042.

Step 4041: Determine, based on the psychoacoustics model parameter of the user, information that can be perceived by the user and information that cannot be perceived by the user in the decoded audio data.

It should be understood that perceivable information in the decoded audio data refers to information that can be heard by the user, and unperceivable information refers to information that cannot be heard by the user.

In this embodiment of this application, based on the human ear quiet threshold curve of the user, the electronic device, the slope of the low-frequency inter-band masking line, the slope of the high-frequency inter-band masking line, and the intra-band masking parameter can determine the information that can be perceived by the user and the information that cannot be perceived by the user in the decoded audio data. Specifically, it is determined, based on the human ear quiet threshold curve of the user, that in the audio data, information less than the human ear quiet threshold in the human ear quiet threshold curve is information that cannot be perceived by the human ear, and information greater than or equal to the human ear quiet threshold is information that can be perceived by the human ear. It can be determined, based on the slope of the low-frequency inter-band masking line, the slope of the high-frequency inter-band masking line, and the intra-band masking parameter, that in the masking frequency band, information less than the masking value in the audio data is information that cannot be perceived by a human ear, and information that is greater than or equal to the masking value is information that can be perceived by a human ear. For details, refer to FIG. 1 and detailed descriptions of the four parameters in FIG. 1. Details are not described herein again.

It should be noted that, in this embodiment of this application, one or more of the intra-band masking parameter, the slope of the low-frequency inter-band masking line, the slope of the high-frequency inter-band masking line, or the human ear quiet threshold curve are calculated based on the auditory feature information of the user. If the psychoacoustics model parameter obtained through calculation based on the auditory feature information of the user is some of the four parameters, values of other parameters may be preset values or may be obtained by using another method. This is not limited in this embodiment of this application. For example, based on the auditory feature information of the user, the calculated parameter is a human ear quiet threshold curve. In this case, the intra-band masking parameter, the slope of the low-frequency inter-band masking line, and the slope of the high-frequency inter-band masking line may be preset values or values obtained by using other methods.

Step 4042: Encode the information that can be perceived by the user in the decoded audio data.

It should be understood that the information that cannot be perceived by the user in the decoded audio data is not encoded.

Optionally, standards for encoding the audio data based on the psychoacoustics model parameter may include AAC, MP3, and the like. In this embodiment of this application, an encoding standard may be selected based on an actual use requirement to encode the decoded audio data.

For example, in this embodiment of this application, AAC is used as an example to briefly describe a process of encoding the decoded audio data. First, audio data (Audio Input) is converted from time domain to frequency domain through time-frequency conversion. Then, information that can be perceived by the user and information that cannot be perceived in a transformed frequency domain signal is determined based on the foregoing four determined psychoacoustics model parameters. The information that can be perceived by the user is quantized, and the information that cannot be perceived by the user is not quantized. Further, noise-free encoding (for example, Huffman noise-free encoding or arithmetic noise-free encoding) is performed on the quantized information. Finally, the electronic device packs the encoded audio data into a bitstream and sends the bitstream to an audio receiver (that is, an audio decoder).

In conclusion, in the audio encoding method provided in this embodiment of this application, the electronic device decodes the received audio data, and then obtains the psychoacoustics model parameter of the user through calculation based on the auditory feature information of the user. Further, a process of re-encoding the decoded audio data based on the psychoacoustics model parameter of the user may be understood as a process that the electronic device performs transcoding on the audio data received by the electronic device.

An embodiment of this application provides a psychoacoustics-based audio encoding method. After the electronic device receives the audio data and decodes the audio data, the electronic device obtains the auditory feature information of the user, calculates the psychoacoustics model parameter of the user based on the auditory feature information of the user, and encodes the decoded audio data based on the psychoacoustics model parameter of the user. The auditory feature information includes at least one of the following: the personal information of the user, the listening test result information of the user, or the frequency response curve information of the user. The psychoacoustics model parameter of the user includes at least one of the following: the intra-band masking parameter, the slope of the low-frequency inter-band masking line, the slope of the high-frequency inter-band masking line, or the human ear quiet threshold curve. In this embodiment of this application, the electronic device receives the audio data from the another device, and decodes the audio data. Then, the electronic device calculates the psychoacoustics model parameter of the user based on the obtained auditory feature information of the user, and performs re-encoding based on the psychoacoustics model parameter of the user. Because the auditory feature information of the user is related to a personalized auditory feature of the user and a hardware feature of a sound-making device, the psychoacoustics model parameter calculated based on the auditory feature information of the user has a personalized feature. Further, the decoded audio data is encoded based on the psychoacoustics model parameter of the user, so that a listening requirement of the user can be met, and sound quality experience of the user can be improved.

The psychoacoustics-based audio coding method provided in this embodiment of this application may be performed by an audio encoding apparatus. The audio encoding apparatus is divided into function modules based on the foregoing method examples. For example, each functional module may be defined in a correspondence to each function, or two or more functions may be integrated in one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 12:
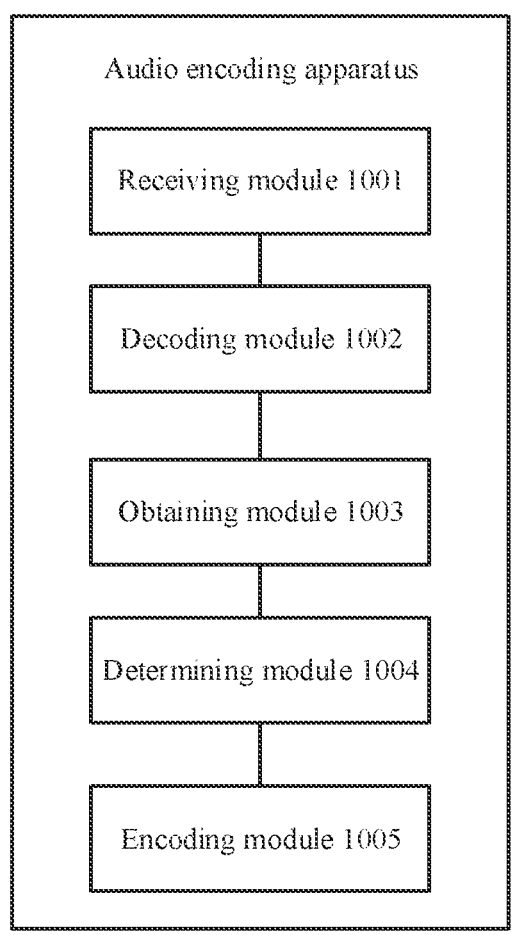
FIG. 12 is a schematic diagram 1 of a structure of an audio encoding apparatus according to an embodiment of this application.

When each function module is defined based on each corresponding function, FIG. 12 is a possible schematic diagram of a structure of the audio encoding apparatus in the foregoing embodiment. As shown in FIG. 12, the audio encoding apparatus may include: a receiving module 1001, a decoding module 1002, an obtaining module 1003, a determining module 1004, and an encoding module 1005. The receiving module 1001 is configured to support the audio encoding apparatus in performing the action of receiving audio data in step 401 in the foregoing method embodiment. The decoding module 1002 is configured to support the audio encoding apparatus in performing the action of decoding the audio data in step 401 in the foregoing method embodiment. The obtaining module 1003 is configured to support the audio encoding apparatus in performing step 402 (including step 4021, step 4022*a* to step 4022*b*, and step 4023) in the foregoing method embodiment. The determining module 1004 is configured to support the audio encoding apparatus in performing step 403 (including step 4031*a* to step 4031*c*, or step 4032*a* to step 4032*b*, or step 4033*a* to step 4033*c*, or step 4034*a* to step 4034*b*) in the foregoing method embodiment. The encoding module 1005 is configured to support the audio encoding apparatus in performing step 404 (including step 4041 to step 4042) in the foregoing method embodiment. All related descriptions of the steps in the foregoing method embodiments may be cited in function descriptions of the corresponding functional modules. Details are not described herein again.

Figure 13:
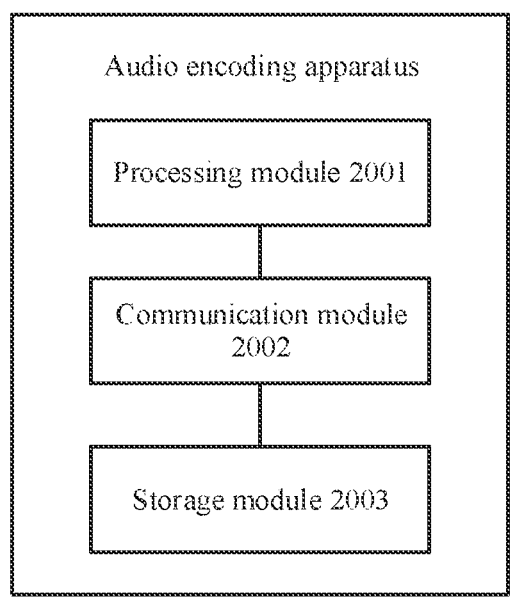
FIG. 13 is a schematic diagram 2 of a structure of an audio encoding apparatus according to an embodiment of this application.

When an integrated unit is used, FIG. 13 is a possible schematic diagram of a structure of an audio encoding apparatus in the foregoing embodiments. As shown in FIG. 13, the audio encoding apparatus may include a processing module 2001 and a communication module 2002. The processing module 2001 may be configured to control and manage an action of the audio encoding apparatus. For example, the processing module 2001 is configured to support the audio encoding apparatus in performing the action of decoding the audio data in step 401 in the foregoing method embodiment, step 402 (including step 4021, step 4022*a* to step 4022*b*, and step 4023), step 403 (including step 4031*a* to step 4031*c*, or step 4032*a* to step 4032*b*, or step 4033*a* to step 4033*c*, or step 4034*a* to step 4034*b*), step 404 (including step 4041 to step 4042), and/or another process of the technology described in this specification. The communication module 2002 is configured to support the audio encoding apparatus in communicating with another network entity. For example, the communication module 2002 is configured to support the audio encoding apparatus in performing the action of receiving the audio data in step 401 in the foregoing method embodiment. Optionally, as shown in FIG. 13, the audio encoding apparatus may further include a storage module 2003, configured to store program code and data of the audio encoding apparatus.

The processing module 2001 may be a processor or a controller (for example, may be the processor 310 shown in FIG. 3), and may be, for example, a CPU, a general purpose processor, a DSP, an ASIC, an FPGA or another programmable logic device, a transistor logic device, a hardware component, or any combination thereof. The processor 2001 may implement or execute various example logical blocks, modules, and circuits described with reference to content disclosed in the embodiments of this application. The processor may be a combination of processors implementing a computing function, for example, a combination of one or more microprocessors, or a combination of the DSP and a microprocessor. The communication module 2002 may be a transceiver, a transceiver circuit, a communication interface, or the like (for example, may be the mobile communication module 350 or the wireless communication module 360 shown in FIG. 3). The storage module 2003 may be a memory (for example, may be the external memory 320 or the internal memory 321 shown in FIG. 3).

When the processing module 2001 is the processor, the communication module 2002 is the transceiver, and the storage module 2003 is the memory, the processor, the transceiver, and the memory may be connected through a bus. The bus may be a peripheral component interconnect (peripheral component interconnect, PCI) bus, an extended industry standard architecture (EISA) bus, or the like. Buses may be classified into an address bus, a data bus, a control bus, and the like.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer instructions are loaded and executed on a computer, all or a part of the procedures or functions according to the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A psychoacoustic-based audio encoding method, comprising:
   receiving audio data;
   decoding the audio data;
   obtaining auditory feature information of a user, wherein the auditory feature information comprises at least one of the following: personal information, listening test result information, or frequency response curve information;

calculating a psychoacoustics model parameter of the user based on the auditory feature information of the user, wherein the psychoacoustics model parameter comprises an intra-band masking parameter, a slope of a low-frequency inter-band masking line, a slope of a high-frequency inter-band masking line, and a human ear quiet threshold curve, and wherein the calculating comprises:

performing fitting on quiet threshold test result information of the user to obtain the human ear quiet threshold curve; and performing fitting on masking test result information of the user to obtain the intra-band masking parameter, the slope of the low-frequency inter-band masking line, and the slope of the high-frequency inter-band masking line; and encoding the decoded audio data based on the psychoacoustics model parameter of the user.

2. The method according to claim 1, wherein the obtaining auditory feature information of a user comprises:

obtaining personal information input by the user in a user information input interface of an electronic device, wherein the personal information comprises at least one of the following: gender information, age information, listening preference information, listening environment information, or working environment information.

3. The method according to claim 1, wherein the listening test result information comprises the quiet threshold test result information and the masking test result information, the quiet threshold test result information comprises human ear quiet thresholds corresponding to a plurality of frequency values in a masking frequency band, the masking test result information comprises masking values corresponding to the plurality of frequency values.

4. The method according to claim 3, wherein the obtaining auditory feature information of a user comprises:

obtaining the plurality of frequency values input by the user in a first audio test interface of an electronic device;

obtaining the human ear quiet thresholds of the user corresponding to the plurality of frequency values;

obtaining the quiet threshold test result information based on the plurality of frequency values input in the first audio test interface and the human ear quiet thresholds of the user corresponding to the plurality of frequency values, wherein a human ear quiet threshold of the user represents a boundary energy value of test audio;

obtaining the plurality of frequency values input by the user in a second audio test interface of the electronic device;

obtaining the masking values corresponding to the plurality of frequency values; and obtaining the masking test result information based on the plurality of frequency values input in the second audio test interface and the masking values corresponding to the plurality of frequency values, and a masking value represents the boundary energy value of the test audio.

5. The method according to claim 1, wherein the calculating a psychoacoustics model parameter of the user based on the auditory feature information of the user comprises:

determining, from a preset sample library based on the personal information of the user, a plurality of test samples that match the personal information of the user, wherein the quiet threshold test result information corresponds to the plurality of test samples, and the masking test result information corresponds to the plurality of test samples.

6. The method according to claim 1, wherein the calculating a psychoacoustics model parameter of the user based on the auditory feature information of the user comprises:

determining, from a preset sample library based on the frequency response curve information of the user, a plurality of test samples that match the frequency response curve information of the user, wherein the quiet threshold test result information corresponds to the plurality of test samples, and the masking test result information corresponds to the plurality of test samples.

7. The method according to claim 1, wherein the calculating a psychoacoustics model parameter of the user based on the auditory feature information of the user comprises:

calculating, based on at least two types of auditory feature information of the personal information of the user, the listening test result information of the user, and the frequency response curve information of the user, psychoacoustics model parameters respectively corresponding to the at least two types of auditory feature information; and performing weighted summation on the psychoacoustics model parameters respectively corresponding to the at least two types of auditory feature information to obtain the psychoacoustics model parameter of the user.

8. The method according to claim 1, wherein the psychoacoustics model parameter comprises a psychoacoustics model parameter corresponding to at least one subband, the psychoacoustics model parameter corresponding to the subband comprises at least one of the following: an intra-band masking parameter of the subband, a slope of a low-frequency inter-band masking line of the subband, a slope of a high-frequency inter-band masking line of the subband, or a human ear quiet threshold curve of the subband.

9. The method according to claim 1, wherein the encoding the decoded audio data based on the psychoacoustics model parameter of the user comprises:

determining, based on the psychoacoustics model parameter of the user, information perceivable by the user and information unperceivable by the user in the decoded audio data; and encoding the information perceivable by the user in the decoded audio data.

10. An electronic device, comprising:

at least one processor; and one or more memories coupled to the at least one processor and storing programming instructions for execution by the at least one processor to perform operations comprising:

receiving audio data;

decoding the audio data;

obtaining auditory feature information of a user, wherein the auditory feature information comprises at least one of the following: personal information, listening test result information, or frequency response curve information;

calculating a psychoacoustics model parameter of the user based on the auditory feature information of the user, wherein the psychoacoustics model parameter comprises an intra-band masking parameter, a slope of a low-frequency inter-band masking line, a slope of a high-frequency inter-band masking line, and a human ear quiet threshold curve, and wherein the calculating comprises:

performing fitting on quiet threshold test result information of the user to obtain the human ear quiet threshold curve; and performing fitting on masking test result information of the user to obtain the intra-band masking parameter, the slope of the low-frequency inter-band masking line, and the slope of the high-frequency inter-band masking line; and encoding the decoded audio data based on the psychoacoustics model parameter of the user.

11. The electronic device according to claim 10, wherein the obtaining auditory feature information of a user comprises:

obtaining personal information input by the user in a user information input interface of an electronic device, wherein the personal information comprises at least one of the following: gender information, age information, listening preference information, listening environment information, or working environment information.

12. The electronic device according to claim 10, wherein the listening test result information comprises the quiet threshold test result information and the masking test result information, the quiet threshold test result information comprises human ear quiet thresholds corresponding to a plurality of frequency values in a masking frequency band, the masking test result information comprises masking values corresponding to the plurality of frequency values.

13. The electronic device according to claim 12, wherein the obtaining auditory feature information of a user comprises:

obtaining the plurality of frequency values input by the user in a first audio test interface of an electronic device;

obtaining the human ear quiet thresholds of the user corresponding to the plurality of frequency values;

obtaining the quiet threshold test result information based on the plurality of frequency values input in the first audio test interface and the human ear quiet thresholds of the user corresponding to the plurality of frequency values, wherein a human ear quiet threshold of the user represents a boundary energy value of test audio;

obtaining the plurality of frequency values input by the user in a second audio test interface of the electronic device;

obtaining the masking values corresponding to the plurality of frequency values; and obtaining the masking test result information based on the plurality of frequency values input in the second audio test interface and the masking values corresponding to the plurality of frequency values, and a masking value represents the boundary energy value of the test audio.

14. The electronic device according to claim 10, wherein the calculating a psychoacoustics model parameter of the user based on the auditory feature information of the user comprises:

determining, from a preset sample library based on the personal information of the user, a plurality of test samples that match the personal information of the user, wherein the quiet threshold test result information corresponds to the plurality of test samples, and the masking test result information corresponds to the plurality of test samples.

15. The electronic device according to claim 10, wherein the calculating a psychoacoustics model parameter of the user based on the auditory feature information of the user comprises:

determining, from a preset sample library based on the frequency response curve information of the user, a plurality of test samples that match the frequency response curve information of the user, wherein the quiet threshold test result information corresponds to the plurality of test samples, and the masking test result information corresponds to the plurality of test samples.

16. The electronic device according to claim 10, wherein the calculating a psychoacoustics model parameter of the user based on the auditory feature information of the user comprises:

calculating, based on at least two types of auditory feature information of the personal information of the user, the listening test result information of the user, and the frequency response curve information of the user, psychoacoustics model parameters respectively corresponding to the at least two types of auditory feature information; and performing weighted summation on the psychoacoustics model parameters respectively corresponding to the at least two types of auditory feature information, to obtain the psychoacoustics model parameter of the user.

17. The electronic device according to claim 10, wherein the psychoacoustics model parameter comprises a psychoacoustics model parameter corresponding to at least one subband, the psychoacoustics model parameter corresponding to the subband comprises at least one of the following: an intra-band masking parameter of the subband, a slope of a low-frequency inter-band masking line of the subband, a slope of a high-frequency inter-band masking line of the subband, or a human ear quiet threshold curve of the subband.

18. The electronic device according to claim 10, wherein the encoding the decoded audio data based on the psychoacoustics model parameter of the user comprises:

determining, based on the psychoacoustics model parameter of the user, information perceivable by the user and information unperceivable by the user in the decoded audio data; and encoding the information perceivable by the user in the decoded audio data.

\* \* \* \* \*